(12) United States Patent
Ohno et al.

(10) Patent No.: US 10,863,120 B2
(45) Date of Patent: Dec. 8, 2020

(54) IMAGING DEVICE, IMAGING MODULE, AND IMAGING METHOD

(71) Applicant: HITACHI, LTD., Tokyo (JP)

(72) Inventors: Chiyo Ohno, Tokyo (JP); Yusuke Nakamura, Tokyo (JP); Kazuyuki Tajima, Tokyo (JP); Koji Yamasaki, Tokyo (JP); Takeshi Shimano, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/292,426

(22) Filed: Mar. 5, 2019

(65) Prior Publication Data

US 2019/0306443 A1 Oct. 3, 2019

(30) Foreign Application Priority Data

Mar. 27, 2018 (JP) .................................. 2018-59189

(51) Int. Cl.
*H04N 5/357* (2011.01)
*H04N 5/369* (2011.01)

(52) U.S. Cl.
CPC ............. *H04N 5/357* (2013.01); *H04N 5/379* (2018.08)

(58) Field of Classification Search
CPC ............................... H04N 5/357; H04N 5/379
See application file for complete search history.

(56) References Cited

U.S. PATENT DOCUMENTS

2018/0136480 A1* 5/2018 Shimano ................ H04N 5/335

FOREIGN PATENT DOCUMENTS

JP 2017-145348 A 8/2017

* cited by examiner

*Primary Examiner* — Twyler L Haskins
*Assistant Examiner* — Fayez Bhuiyan
(74) *Attorney, Agent, or Firm* — Mattingly & Malur, PC

(57) ABSTRACT

An imaging device includes: a modulator configured to modulate the intensity of light, based on a real pattern; an image sensor configured to convert light passing through the modulator to electrical signals to generate a sensor image; a complex sensor image processing unit configured to generate a complex sensor image including a complex number, from an image obtained by executing predetermined positioning for the sensor image taken through the real pattern; and an image processing unit configured to restore an image, based on an operation with the complex sensor image and data of a pattern for reconstruction.

6 Claims, 29 Drawing Sheets

PATTERN 801 FOR RECONSTRUCTION

FIG.21
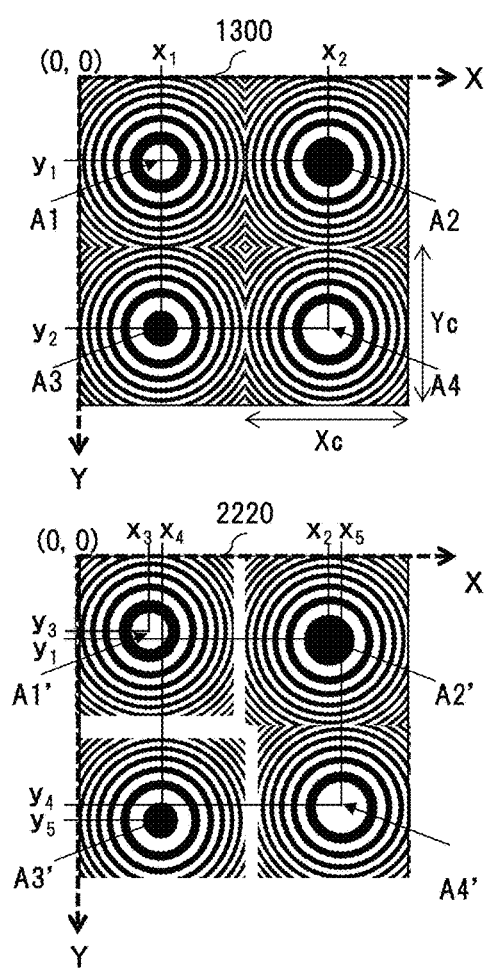
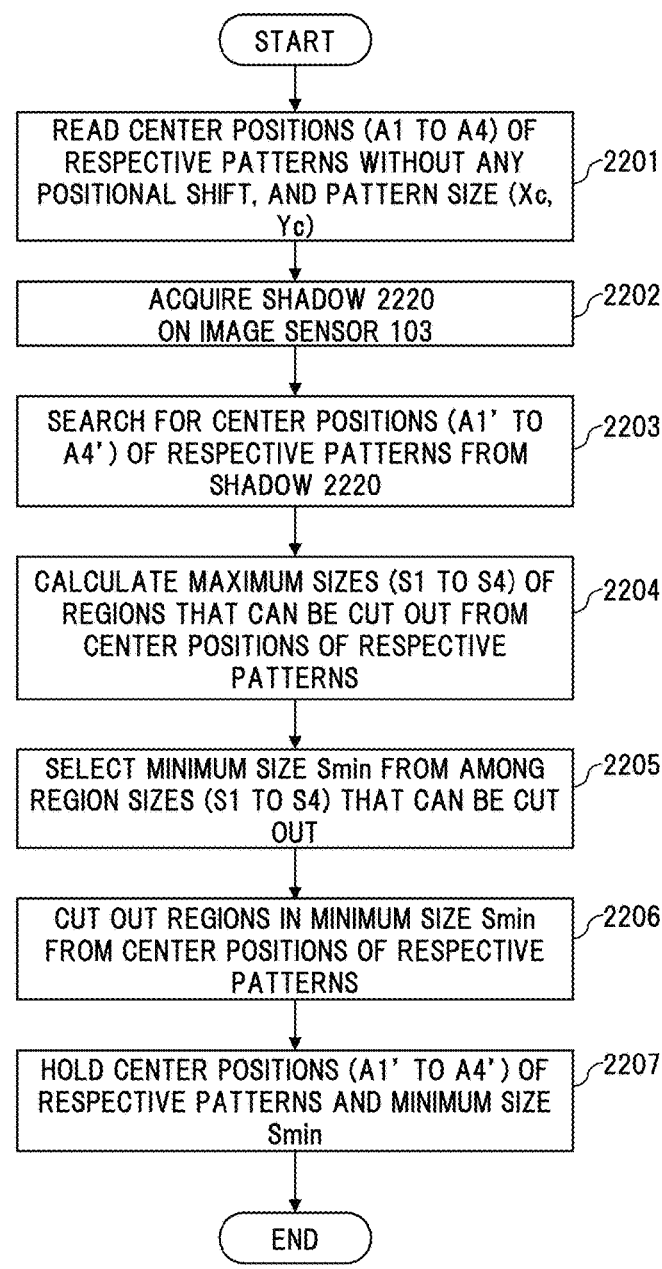

FIG.28

| PATTERN SIZE | Xc, Yc |
|---|---|
| PATTERN 1(φ=0) | REFERENCE POSITION A1=(x1, y1) |
| PATTERN 2(φ=π/2) | REFERENCE POSITION A2=(x2, y1) |
| PATTERN 3(φ=π) | REFERENCE POSITION A3=(x1, y2) |
| PATTERN 4(φ=3π/2) | REFERENCE POSITION A4=(x2, y2) |

2810

2800

| DISTANCE | 5cm |
|---|---|

| DISTANCE | 50cm |
|---|---|

2820

| DISTANCE | PAN-FOCUS |
|---|---|
| PATTERN 1(φ=0) | REFERENCE POSITION A1'=(x3, y3) |
| PATTERN 2(φ=π/2) | REFERENCE POSITION A2'=(x4, y4) |
| PATTERN 3(φ=π) | REFERENCE POSITION A3'=(x5, y5) |
| PATTERN 4(φ=3π/2) | REFERENCE POSITION A4'=(x6, y6) |
| MINIMUM SIZE Smin | Xs, Ys |

IMAGING DEVICE, IMAGING MODULE, AND IMAGING METHOD

CLAIM OF PRIORITY

This application claims the priority based on the Japanese Patent Application No. 2018-59189 filed on Mar. 27, 2018. The entire contents of which are incorporated herein by reference for all purpose.

BACKGROUND

Technical Field

The present invention relates to an imaging device, an imaging module, and an imaging method.

Related Art

There is JP 2017-145348 A (Patent Literature 1) as related art in the present technical field. This patent literature discloses a technique of attaching a special diffraction grating substrate to an image sensor, and in accordance with an inverse problem, figuring out the incidence angle of incident light from a projection pattern produced on the image sensor by light passing through the diffraction grating substrate, thereby providing an image of an external object.

SUMMARY

According to the technique disclosed in JP 2017-145348 A, the diffraction grating pattern formed on the upper surface of the substrate attached to the image sensor has multiple different patterns, thereby removing noise which has an influence on the image quality of a reproduced image (hereinafter, referred to as a reconstructed image). However, in a case in which any of the multiple patterns is shifted from the intended position (for example, among patterns A, B, C, and D, the center position of the pattern B is shifted, or the pattern C is rotated), or the upper surface of the substrate is not parallel to the sensor surface (for example, the upper surface is inclined), this method has the problem of causing the projection pattern received by the image sensor to suffer a positional shift or a distortion, thereby failing to obtain a properly reconstructed image even through image reconstruction.

The present application encompasses more than one means for solving at least part of the problem mentioned above, and an example of the means will be given as follows. In order to solve the problem mentioned above, an imaging device according to an aspect of the present invention includes: a modulator configured to modulate the intensity of light, based on a real pattern; an image sensor configured to convert light passing through the modulator to electrical signals to generate a sensor image; a complex sensor image processing unit configured to generate a complex sensor image including a complex number, from an image obtained by executing predetermined positioning for the sensor image taken through the real pattern; and an image processing unit configured to restore an image, based on an operation with the complex sensor image and data of a pattern for reconstruction.

According to the present invention, a technique can be provided which appropriately corrects a shift or the like in pattern position to provide a properly reconstructed image.

Objects, configurations, and advantageous effects other than the foregoing will be evident from the following description of embodiments.

BRIEF DESCRIPTION OF DRAWINGS

FIG. 21 is a diagram showing a processing flow example of processing for measuring a shift in horizontal position;

FIG. 28 is a diagram showing a structure example of information on a shift in horizontal position.

DETAILED DESCRIPTION

Figure 1:
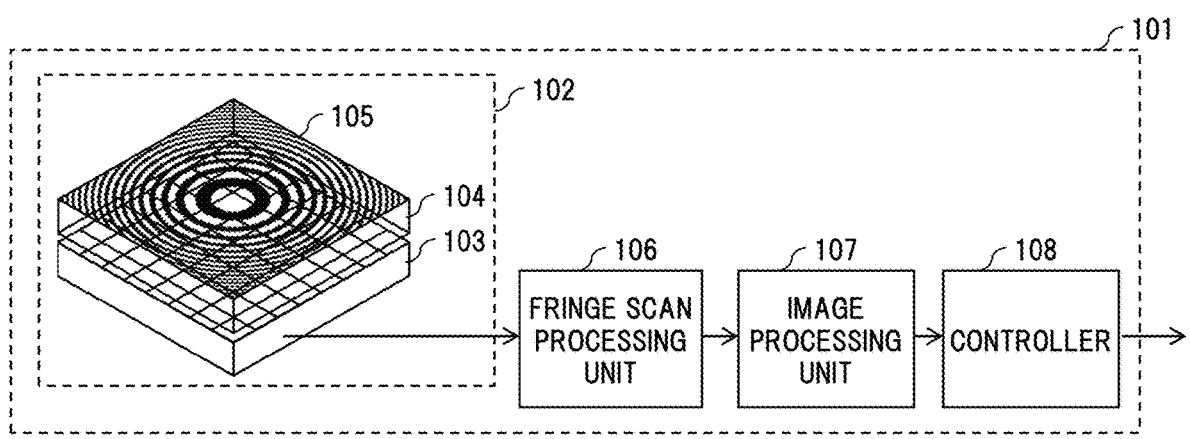
FIG. 1 is a diagram illustrating a configuration example of an imaging device according to a first example of the present invention.

In the following embodiments, explanations will be given which are divided into multiple sections or embodiments, if necessary, for the sake of convenience. However, unless expressly stated otherwise, the sections or embodiments are not to be considered independent of one another, but one section or embodiment has a relation partially or entirely with the other, such as modification examples, details, and supplemental explanations.

In addition, in the following embodiments, in the case of referring to the numbers (including numbers, numerical values, amounts, ranges, and the like) of elements, the numbers are not to be considered limited to any specific number, unless expressly stated otherwise, and unless obviously limited to the specific numbers in principle, but may be the specific numbers or more, or less.

Furthermore, in the following embodiments, obviously, the constituent elements (also including elemental steps) are not necessarily to be considered indispensable, unless expressly stated otherwise, and unless considered obviously indispensable in principle.

Likewise, in the following embodiments, in the case of referring to the shapes, positional relationship, and the like of the constituent elements, the shapes and the like are considered including equivalents substantially approximate or similar to the shapes and the like, unless expressly stated otherwise, and unless obviously excluded in principle. The same applies to the numerical values and ranges mentioned above.

In addition, throughout all of the drawings for the explanation of embodiments, the same members are denoted by the same reference numerals in principle, and repeated descriptions thereof will be omitted. Examples of the present invention will be described below with reference to the drawings.

In general, the reduction in thickness and the reduction in cost are often required for digital cameras mounted in information devices such as car-mounted cameras, wearable devices, and smartphone. For example, an imaging method has been proposed which obtains an object image without using any lens, thereby achieving the reduction in thickness and the reduction in cost. Such techniques include an imaging method of attaching a special grating pattern in front of an image sensor, and solving an inverse problem for image reconstruction from a projection pattern received by the image sensor, thereby providing an object image. This method makes the operation complex in solving the inverse problem by signal processing, thereby due to the high processing load, increasing the hardware requirements specifications for the information devices. The present invention aims at allowing the reduction in thickness while keeping down the processing load.

Example 1

<Shooting Principle for Object at Infinity>

FIG. 1 is a diagram illustrating the configuration of an imaging device 101 according to Example 1 of the present invention. The imaging device 101 is adapted to capture an image of an external object without using any lens for imaging, and composed of, as shown in FIG. 1 an imaging module 102, a fringe scan processing unit 106, an image processing unit 107, and a controller 108. An example of the imaging module 102 is shown in FIG. 2.

Figure 2:
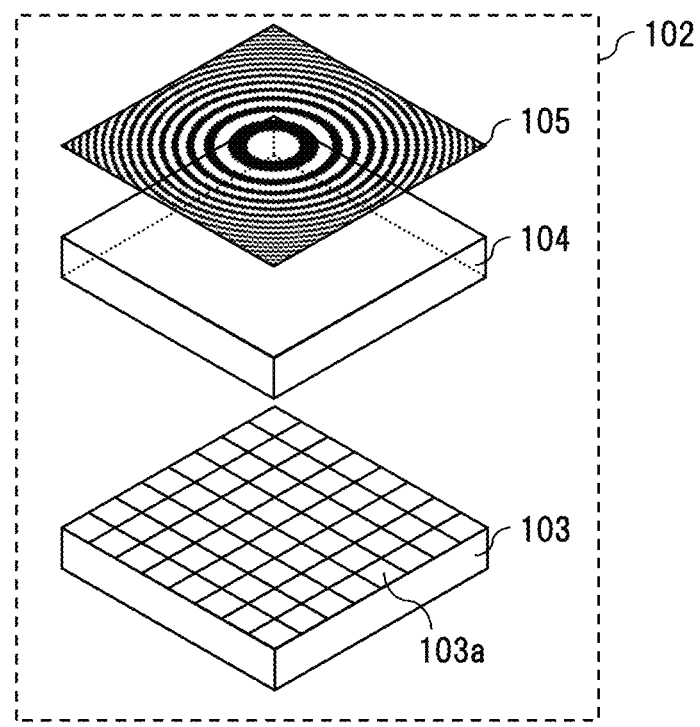
FIG. 2 is a diagram illustrating a configuration example of an imaging module according to the first example.

FIG. 2 is a diagram illustrating the configuration of the imaging module according to the first example. The imaging module 102 is composed of an image sensor 103, a pattern substrate 104, and a real pattern 105. The pattern substrate 104 is fixed in close contact with the light-receiving surface of the image sensor 103, and the real pattern 105 is formed on the pattern substrate 104. The pattern substrate 104 is made of a material that is transparent to visible light, for example, such as glass or plastics.

The real pattern 105 is composed of a concentric grating pattern with a grating pattern interval, that is, a pitch made fine outward in inverse proportion to the radius from the center. The real pattern 105 is formed by vapor deposition of a metal such as aluminum and chromium through, for example, a sputtering method or the like which is used for semiconductor processes. A contrast is formed by a pattern with the metal vapor-deposited and a pattern without the metal vapor-deposited. It is to be noted that the formation of the real pattern 105 is not to be considered limited to the vapor deposition, but for example, the contrast may be formed by printing or the like with an ink-jet printer or the like. Furthermore, although visible light has been cited as an example herein, for example, in the case of shooting with far-infrared rays, a material that is transparent to a wavelength intended for shooting, e.g., a material that is transparent to far-infrared rays, for example, such as germanium, silicon, or chalcogenide, may be used for the pattern substrate 104, whereas a material that blocks the wavelength, such as a metal, may be used for the real pattern 105.

In addition, the pattern substrate 104 and the real pattern 105 can be also referred to as a modulator that modulates the intensity of light incident onto the image sensor 103. It is to be noted that while a method of forming the real pattern 105 on the pattern substrate 104 has been mentioned herein in order to achieve the imaging module 102, the imaging module 102 can be also achieved to be configured as shown in FIG. 3.

Figure 3:
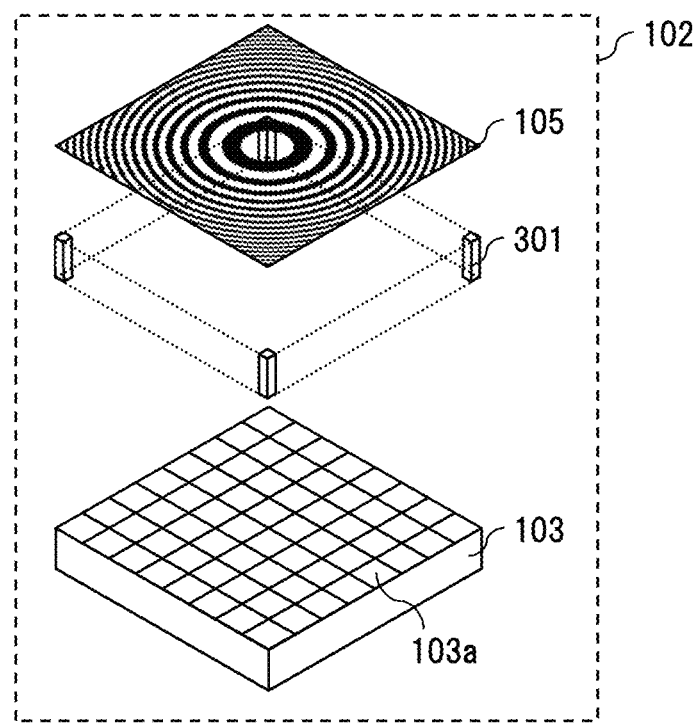
FIG. 3 is a diagram illustrating a configuration example of another imaging module according to the first example.

FIG. 3 is a diagram illustrating a configuration example of another imaging module according to the first example. In the configuration example shown in FIG. 3, the real pattern 105 is formed in a thin film, and held by supporting members 301.

It is to be noted that in this device, the angle of view for shooting can be changed depending on the thickness of the pattern substrate 104. Therefore, for example, as long as the pattern substrate 104 has the configuration of FIG. 3 and has the function of being capable of changing the lengths of the supporting members 301, it is also possible to change the angle of view for shooting at the time of shooting.

The surface of the image sensor 103 has pixels 103a as light-receiving elements arranged regularly in a grid-like form. This image sensor 103 converts optical images received by the pixels 103a to image signals as electrical signals.

The light intensity of light that passes through the real pattern 105 is modulated by the pattern, and the passing light is received by the image sensor 103. The image sensor 103 is composed of, for example, a CCD (Charge Coupled Device) image sensor, a CMOS (Complementary Metal Oxide Semiconductor) image sensor, or the like.

The image signals output from the image sensor 103 have data subjected to noise removal by the fringe scan processing unit 106, and to image processing by the image processing unit 107, and the data subjected to the image processing is output to the controller 108. In the case of outputting the output to a host computer or an external recording medium, the controller 108 convers the data format so as to fit into an interface such as a USB, and outputs the data.

Next, the shooting principle in the imaging device 101 will be described. First, the real pattern 105 is a concentric grating pattern with a pitch made fine in inverse proportion to the radius from the center, and can be defined as follows with the use of a radius r from the reference coordinate as the center of the concentric circle and a coefficient β:

[Mathematical Formula 1]

$$I(r)=1+\cos \beta r^2 \qquad (1)$$

The real pattern 105 shall have a transparent modulated in proportion to the foregoing formula. It is to be noted that hereinafter, for the sake of simplification, an explanation for only the x-axis direction will be given with mathematical formulas, but also considering the y-axis direction as well makes it possible to see two-dimensional deployment.

The plate with such a fringe is referred to as Gabor Zone Plate (GZP: Gabor Zone Plate) or Fresnel Zone Plate (FZP: Fresnel Zone Plate).

Figure 4:
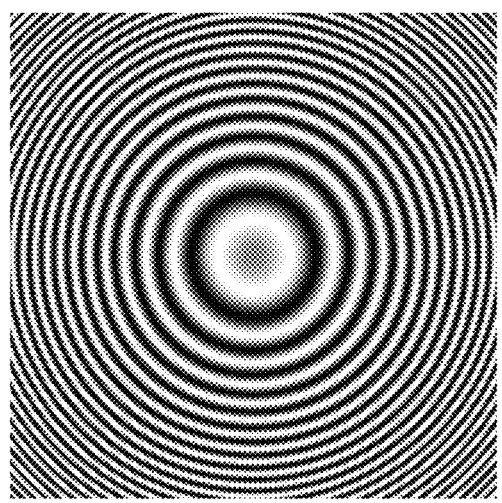
FIG. 4 is a diagram illustrating an example of a real pattern and a pattern for reconstruction according to the first example.

FIG. 4 is a diagram illustrating an example of the real pattern and pattern for reconstruction according to the first example. Specifically, FIG. 4 is an example of the Gabor Zone Plate represented by the foregoing formula 1.

Figure 5:
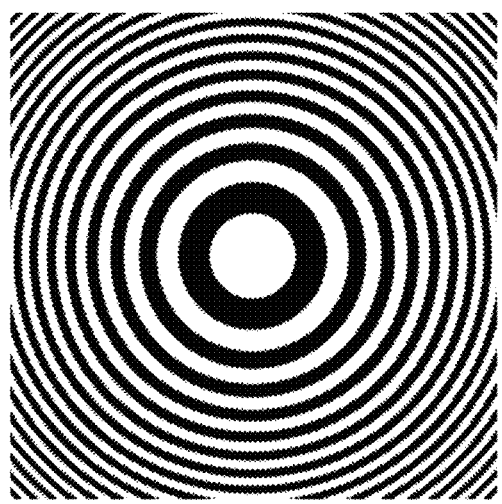
FIG. 5 is a diagram illustrating another example of the real pattern and pattern for reconstruction according to the first example.

FIG. 5 is a diagram illustrating another example of the real pattern and pattern for reconstruction according to the first example. Specifically, FIG. 5 is an example of Fresnel Zone Plate that uses a pattern obtained as a result of binarizing the foregoing formula 1 with a threshold value 1.

Figure 6:
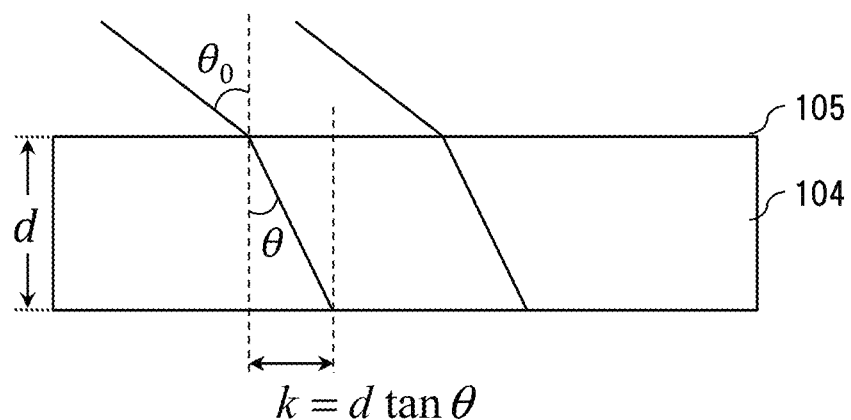
FIG. 6 is a diagram illustrating an example of an in-plane shift produced for a shadow from a pattern substrate surface to an image sensor with oblique incident parallel light.

Assume that parallel light enters at an angle $\theta_0$ in the x-axis direction as shown in FIG. 6 onto the pattern substrate 104 of d in thickness with the real pattern 105 formed. In a geometric optical manner, where the refraction angle in the substrate 104 is denoted by θ, light multiplied by the transmission of the grating at the surface enters the image sensor 103, just with a k=d·tan θ shift. In this case, a shadow with the following intensity distribution is detected on the image sensor 103:

[Mathematical Formula 2]

$$I_F(x)=1+\cos[\beta(x+k)^2+\Phi] \qquad (2)$$

Figure 7:
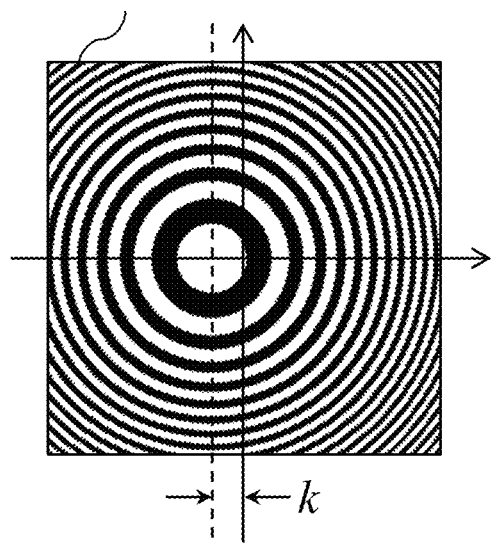
FIG. 7 is a diagram illustrating an example of a shadow of a real pattern.

It is to be noted that Φ represents an initial phase of a transmission distribution in accordance with the foregoing formula. FIG. 7 shows therein an example of the shadow of the real pattern 105.

FIG. 7 is a diagram illustrating an example of the shadow of the real pattern. As shown in FIG. 7, in the case of parallel light incidence as in FIG. 6 through the use of the real pattern 105, the pattern is projected onto the image sensor 103, with a k shift as in the foregoing formula 2. This image corresponds to the output of the imaging unit 102.

Next, processing for reconstruction is executed in the image processing unit 107, and of all others, the processing of reconstruction achieved by a correlation reconstruction method and a moire reconstruction method will be described.

Figure 8:
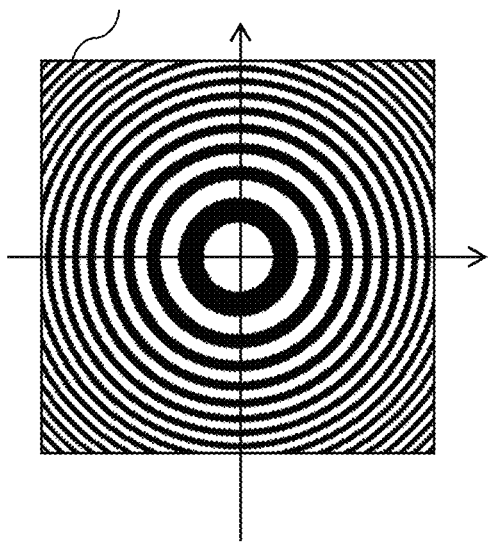
FIG. 8 is a diagram illustrating an example of a pattern for reconstruction.
Figure 9:
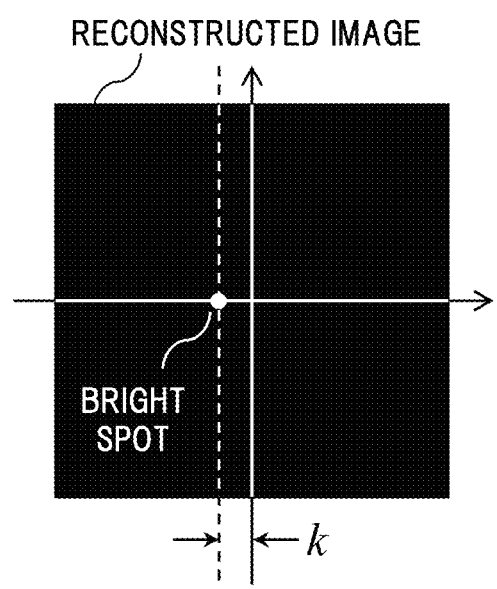
FIG. 9 is a diagram illustrating an example of an image reconstructed by a correlation reconstruction method.

In accordance with the correlation reconstruction method, the image processing unit 107 computes a cross-correlation function between the shadow of the real pattern 105, shown in FIG. 7, and a pattern 801 for reconstruction, shown in FIG. 8, thereby making it possible to obtain a bright spot with a shift amount of "k", shown in FIG. 9. It is to be noted that typically, the operation quantity will be increased if the cross-correlation operation is performed in accordance with a two-dimensional convolution operation.

FIG. 8 is a diagram illustrating an example of a pattern for reconstruction. Specifically, the pattern 801 for reconstruction has the same pattern as the FZP shown in FIG. 5. According to the present embodiment, there is no need for the pattern 801 for reconstruction to have any physical entity, and the pattern 801 for reconstruction has only to be present as information for use in image processing.

FIG. 9 is a diagram illustrating an example of the image reconstructed by the correlation reconstruction method. The reconstruction by the correlation reconstruction method can provide a reconstructed image with a bright spot shifted by "k" as described above.

In this regard, the principle of a cross-correlation operation example through the use of Fourier transform without the two-dimensional convolution operation will be described with reference to mathematical formulas. First, Gabor Zone Plate or Fresnel Zone Plate is used for the pattern 801 for reconstruction as well as the real pattern 105. Therefore, the pattern 801 for reconstruction can be expressed as follows with the use of the initial phase Φ:

[Mathematical Formula 3]

$$I_B(x)=\cos(\beta x^2+\Phi) \qquad (3)$$

It is to be noted that the pattern 801 for reconstruction is used in image processing, and thus not required to be offset with 1 as in the foregoing formula 1, and may have a negative value without any problem.

The Fourier transform of the foregoing formulas 2 and 3 respectively provide results as follows:

[Mathematical Formula 4]

$$\mathcal{F}[I_F(x)] = \delta(u) + \frac{e^{-iku}}{2\sqrt{\pi\beta}}\sin\left(\frac{u^2}{4\beta}-\Phi+\frac{\pi}{4}\right) \qquad (4)$$

[Mathematical Formula 5]

$$\mathcal{F}[I_B(x)] = \frac{1}{2\sqrt{\pi\beta}}\sin\left(\frac{u^2}{4\beta}-\Phi+\frac{\pi}{4}\right) \qquad (5)$$

In this regard, F, u, and δ with brackets respectively represent a Fourier transform operation, a frequency coordinate in the x direction, and a delta function. What is important for the foregoing formulas is that the Fourier transformed formulas also represent Fresnel Zone Plate or Gabor Zone Plate. Therefore, the Fourier transformed pattern for reconstruction may be directly generated on the basis of the foregoing formulas. This direct generation makes it possible to reduce the operation quantity.

Next, the multiplication of the foregoing formula 4 by the foregoing formula 5 provides the following:

[Mathematical Formula 6]

$$\mathcal{F}[I_F(x)] \cdot \mathcal{F}[I_B(x)] = \frac{1}{2\sqrt{\pi\beta}} \sin\left(\frac{\pi}{4} - \Phi\right)\delta(u) + \frac{e^{-iku}}{4\pi\beta} \cdot \left[\sin^2\left(\frac{u^2}{4\beta} - \Phi + \frac{\pi}{4}\right)\right] \quad (6)$$

The term "exp(−iku)" represented by the foregoing exponential function refers to a signal component, and the Fourier transform of the term provides a result as follows:

[Mathematical Formula 7]

$$\mathcal{F}^{-1}[e^{-iku}] = 2\pi\delta(x+k) \quad (7)$$

from which a bright spot can be obtained in the location of "k" on the original x axis. This bright spot indicates a light flux at infinity, which is nothing more or less than a shot image from the imaging device 101 in FIG. 1.

It is to be noted that this correlation reconstruction method may be achieved with a pattern that is not limited to Fresnel Zone Plate or Gabor Zone Plate, for example, a random pattern, as long as the autocorrelation function of the pattern has a single peak.

Figure 10:
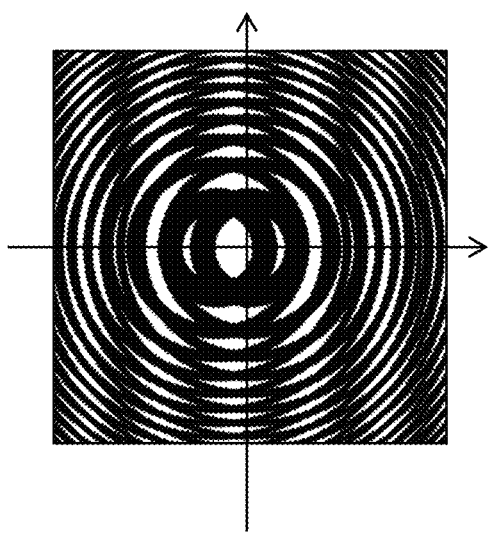
FIG. 10 is a diagram illustrating an example of a moire fringe according to a moire reconstruction method.
Figure 11:
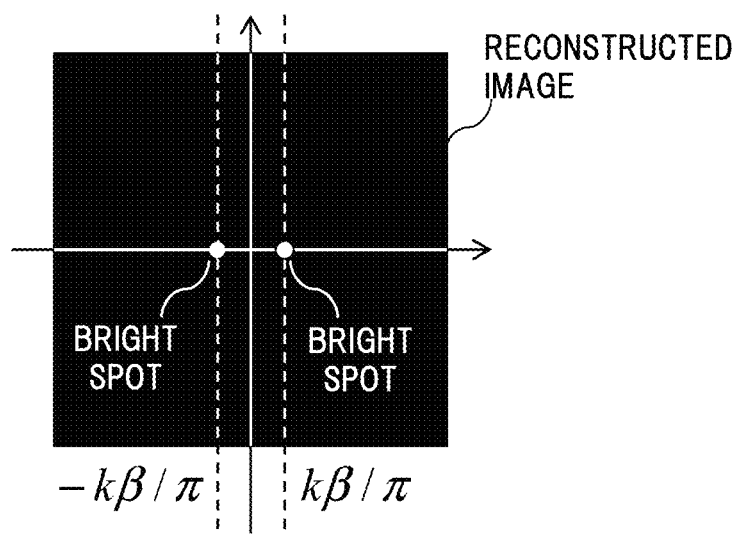
FIG. 11 is a diagram illustrating an example of an image reconstructed by a moire reconstruction method.

Next, the moire reconstruction method multiplies the shadow of the real pattern 105, shown in FIG. 7, by the pattern 801 for reconstruction, shown in FIG. 8, to generate a moire fringe as shown in FIG. 10, and applies a Fourier transform to the moire fringe, thereby making it possible to obtain bright spots with a shift amount of (kβ/π) as shown in FIG. 11.

FIG. 10 is a diagram illustrating an example of the moire fringe obtained by the moire reconstruction method. Specifically, as shown in FIG. 10, the result of the multiplication of the shadow of the real pattern 105, shown in FIG. 7, by the pattern 801 for reconstruction, shown in FIG. 8, is obtained as a moire fringe.

This moire fringe is expressed by the following mathematical formula:

[Mathematical Formula 8]

$$I_F(x) \cdot I_B(x) = \{1+\cos[\beta(x+k)^2+\Phi]\}\cos(\beta x^2+\Phi) = \tfrac{1}{2}[2\cos(\beta x^2+\Phi)+\cos(2\beta x^2+2k\beta x+2\beta k^2+2\Phi)+\cos(2k\beta x+\beta k^2)] \quad (8)$$

The third term of the foregoing expansion formula corresponds to a signal component, and it is determined that equally spaced fringes that are straight in a direction in which the two patterns are shifted are created over the entire regions which have an overlap with each other. This fringe produced at a relatively low spatial frequency by the overlap between the fringes is referred to as a moire fringe.

The two-dimensional Fourier transform of the third term provides a result as follows:

[Mathematical Formula 9]

$$\mathcal{F}[\cos 2k\beta x] = \delta\left(u + \frac{k\beta}{\pi}\right) + \delta\left(u - \frac{k\beta}{\pi}\right) \quad (9)$$

In this regard, F, u, and δ with brackets respectively represent a Fourier transform operation, a frequency coordinate in the x direction, and a delta function. From the foregoing result, it is determined that the spatial frequency spectrum of the moire fringe has spatial frequency peaks produced in the locations of (u=±kβ/π). The bright spots indicate light fluxes at infinity, which are nothing more or less than a shot image from the imaging device 101 in FIG. 1.

FIG. 11 is a diagram illustrating an example of the image reconstructed by the moire reconstruction method. In the reconstructed image shown in FIG. 11, bright spots are obtained in the locations of u=±kβ/π.

It is to be noted that the moire reconstruction method may be achieved with a pattern that is not limited to Fresnel Zone Plate or Gabor Zone Plate, for example, an ellipsoidal pattern, as long as the moire fringe obtained by the pattern shift has a single frequency.

<Noise Cancellation>

The explanation has been given while focusing on the signal component in the transform from the foregoing formula 6 to the foregoing formula 7, and the transform from the foregoing formula 8 to the foregoing formula 9, but in actuality, the term other than the signal component disturbs reconstruction as noise. Therefore, noise cancellation based on fringe scan is effective.

Figure 12:
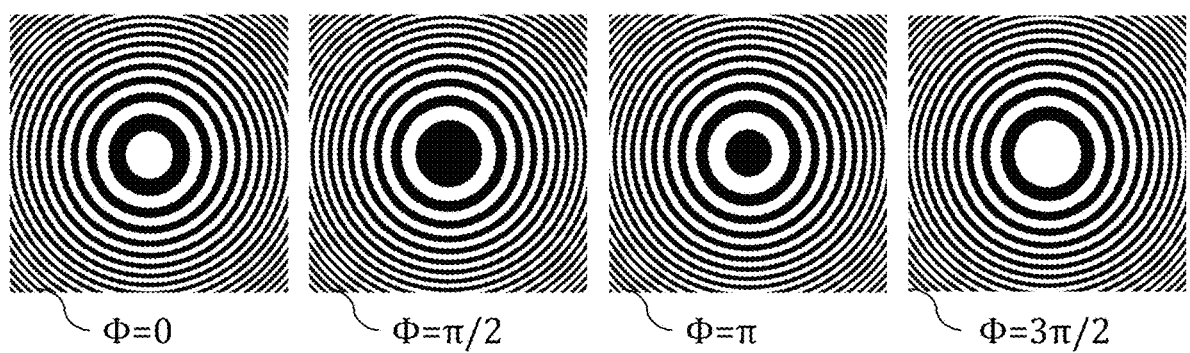
FIG. 12 is a diagram illustrating an example of a combination of initial phases for a real pattern in fringe scan.

For the fringe scan, there is a need to use, as the real pattern 105, multiple patterns that differ in initial phase Φ. FIG. 12 shows therein a multiple pattern example.

FIG. 12 is a diagram illustrating an example of a combination of initial phases for the real pattern in fringe scan. In this case, when sensor images shot with the use of four phases of (Φ=0), (Φ=π/2), (Φ=π), and (Φ=3π/2) are subjected to arithmetic processing in accordance with the following formula, sensor images with complex numbers (complex sensor images) are obtained. This is expressed by the following formula:

[Mathematical Formula 10]

$$I_{CF}(x) = \frac{1}{2}\sum_{\Phi} I_F(x) \cdot \exp(i\Phi), \Phi \in \left\{0, \frac{\pi}{2}, \pi, \frac{3\pi}{2}\right\} \quad (10)$$

$$= \frac{1}{2}\sum_{\Phi}\{1+\cos[\beta(x+k)^2+\Phi]\} \cdot \exp(i\Phi)$$

$$= \exp[i\beta(x+k)^2]$$

In this regard, the complex pattern 801 for reconstruction can be expressed as follows:

[Mathematical Formula 11]

$$I_{CB}(x) = \exp(-i\beta x^2) \quad (11)$$

The pattern 801 for reconstruction, which is used in the fringe scan processing, may thus have any complex number without problem.

In accordance with the moire reconstruction method, the multiplication of the foregoing formula 10 by the foregoing formula 11 provides a result as follows:

[Mathematical Formula 12]

$$I_{CF}(x) \cdot I_{CB}(x) = \exp[i\beta(x+k)^2] \cdot \exp(-i\beta x^2) = \exp[2i\beta kx + i\beta k^2] \quad (12)$$

The term "exp(2iβkx)" represented by the foregoing exponential function refers to a signal component, and it is determined that noise cancellation is achieved because no unnecessary term is produced unlike in the case of the foregoing formula 8.

Likewise, when the correlation reconstruction method is also checked, the Fourier transform of the foregoing formula 10 and the foregoing formula 11 respectively provide results as follows:

[Mathematical Formula 13]

$$\mathcal{F}[I_{CF}(x)] = \frac{1+i}{2\sqrt{2\pi\beta}} \exp(-iku)\exp\left(-i\frac{u^2}{4\beta}\right) \quad (13)$$

[Mathematical Formula 14]

$$\mathcal{F}[I_{CB}(x)] = -\frac{1+i}{2\sqrt{2\pi\beta}} \exp\left(i\frac{u^2}{4\beta}\right) \quad (14)$$

Next, the multiplication of the foregoing formula 13 by the foregoing formula 14 provides a result as follows:

[Mathematical Formula 15]

$$\mathcal{F}[I_{CF}(x)] \cdot \mathcal{F}[I_{CB}(x)] = \frac{-i}{4\pi\beta} \exp(-iku) \quad (15)$$

The term "exp(−iku)" represented by the foregoing exponential function refers to a signal component, and it is determined that noise cancellation is achieved because no unnecessary term is produced unlike in the case of the foregoing formula 8.

It is to be noted that although the example mentioned above has been described with the use of the multiple patterns at the four phases of (Φ=0), (Φ=π/2), (Φ=π), and (Φ=3π/2), the initial phase Φ may be set so as to divide the angle from 0 to 2π equally, and not to be considered limited to the phases.

As a method for achieving the foregoing shooting with multiple patterns, it is conceivable to adopt a method of switching the pattern in a time-division manner in the processing for fringe scan, and a method of switching the pattern in a spatial division manner therein.

In order to achieve the time-division fringe scan, for example, a liquid crystal display element or the like capable of electrically switching and then displaying the multiple initial phases shown in FIG. 12 may be used as the real pattern 105 in FIG. 1. The switching timing of the liquid crystal display element and the shutter timing of the image sensor 103 are controlled in synchronization, and after the acquisition of four images in a time-series manner, a fringe scan operation is executed in the fringe scan processing unit 106.

Figure 13:
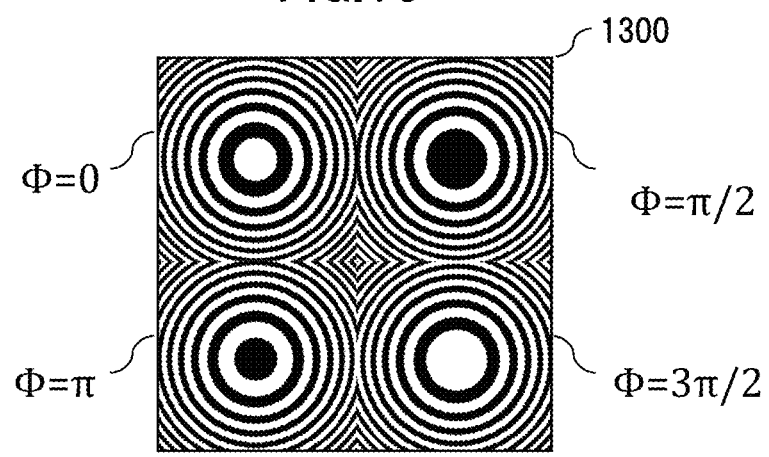
FIG. 13 is a diagram illustrating an example of a real pattern in spatial division fringe scan.

In contrast thereto, in order to achieve the spatial division fringe scan, there is a need to use the real pattern 105 with multiple pattern regions different in initial phase as shown in FIG. 13. After the acquisition of one image as a whole, in the fringe scan processing unit 106, the image is divided into four corresponding to the pattern regions at the respective initial phases, and a fringe scan operation is executed.

FIG. 13 is a diagram illustrating an example of the real pattern for the spatial division fringe scan. The real pattern 1300 for the spatial division fringe scan is an application example of the real pattern 105, which is a real pattern, spatially divided on the XY plane (the plane surface parallel to the image sensor 103) to include multiple pattern regions that differ in initial phase (four phases of (Φ=0), (Φ=π/2), (Φ=π), and (Φ=3π/2)). Next, the fringe scan operation in the fringe scan processing unit 106 will be described.

Figure 14:
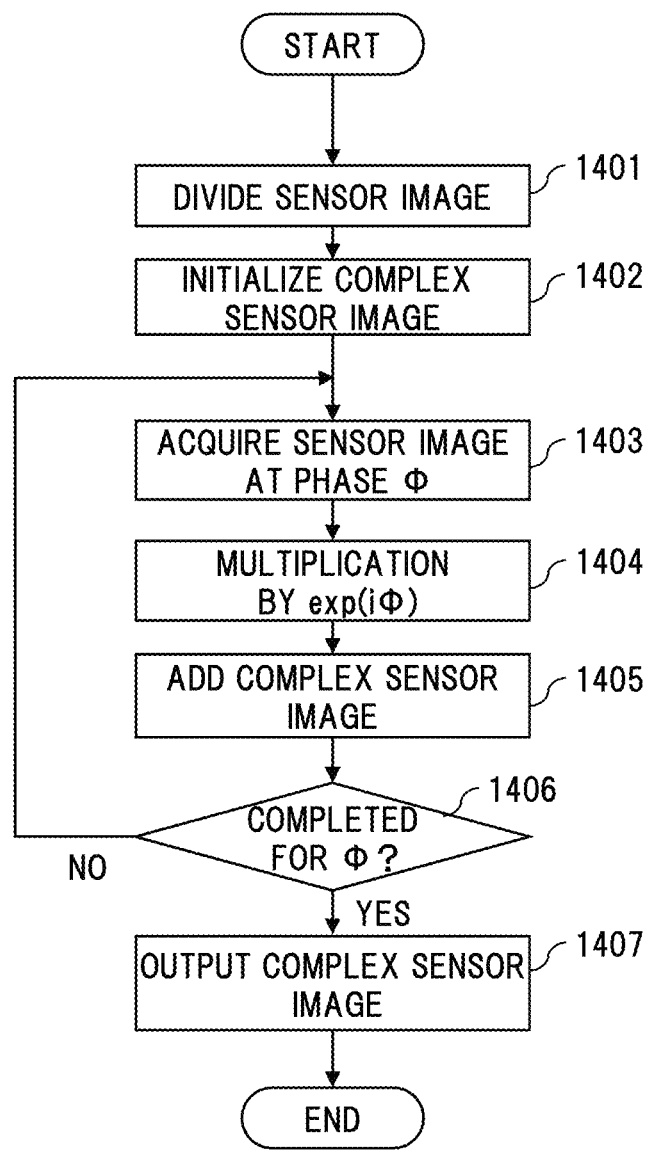
FIG. 14 is a diagram showing a processing flow example for fringe scan.

FIG. 14 is a diagram showing a processing flow example for fringe scan. First, the fringe scan processing unit 106 acquires sensor images in accordance with multiple shooting patterns, which are output from the image sensor 103, and in the case of adopting the spatial division fringe scan, there is a need to divide an acquired sensor image in accordance with individual shooting patterns, and multiple sensor images are thus obtained by the division into predetermined regions (step 1401). It is to be noted that in the case of adopting the time-division fringe scan, the division is not executed, because multiple sensor images in accordance with shooting patterns that differ in initial phase are obtained with a passage of time.

Next, the fringe scan processing unit 106 initializes complex sensor images for output (step 1402).

Then, the fringe scan processing unit 106 acquires a sensor image at a first initial phase Φ (step 1403).

Then, the fringe scan processing unit 106 multiplies the image by exp(iΦ) in accordance with the initial phase Φ (step 1404).

Then, the fringe scan processing unit 106 adds the multiplication result to the complex sensor image (step 1405).

The fringe scan processing unit 106 repeats the processing from the step 1403 to the step 1405 in accordance with the number of initial phases used (step 1406). For example, in fringe scan that uses four phases as shown in FIG. 12, the fringe scan processing unit 106 repeats the processing four times in total at the respective initial phases of (Φ=0), (Φ=π/2), (Φ=π), and (Φ=3π/2).

Then, the fringe scan processing unit 106 outputs the complex sensor images (step 1407). The foregoing processing executed by the fringe scan processing unit 106 from the step 1401 to the step 1407 is processing corresponding to the foregoing formula 10. Next, image processing in the image processing unit 107 will be described.

Figure 15:
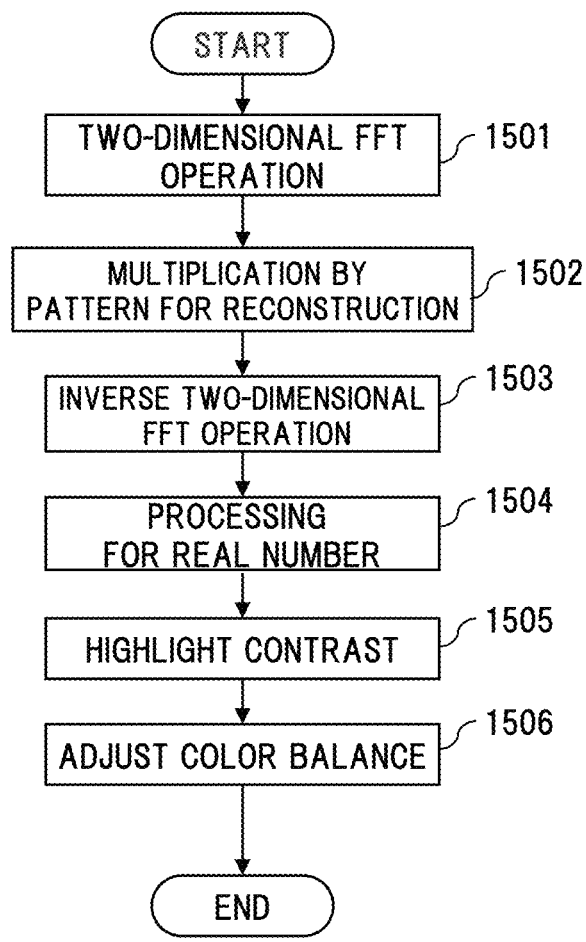
FIG. 15 is a diagram showing a processing flow example of processing for reconstruction by a correlation reconstruction method.

FIG. 15 is a diagram showing a processing flow example of processing for reconstruction by the correlation reconstruction method. First, the image processing unit 107 acquires the complex sensor images output from the fringe scan processing unit 106, and applies a two-dimensional fast Fourier transform (FFT: Fast Fourier Transform) operation to the complex sensor images (step 1501).

Next, the image processing unit 107 generates the predefined pattern 801 for reconstruction for use in the processing for reconstruction, and multiplies the complex sensor images subjected to the two-dimensional FFT operation, by the pattern 801 for reconstruction (step 1502).

Then, the image processing unit 107 executes an inverse two-dimensional FFT operation (step 1503). It is to be noted that this operation result has a complex number.

Therefore, the image processing unit 107 obtains the absolute values from the operation result of the inverse two-dimensional FFT operation or extracts the real parts therefrom to reconstruct, as real numbers, the images to be shot (step 1504).

Thereafter, the image processing unit 107 applies, to the reconstructed images obtained, processing for contrast highlighting (step 1505). Furthermore, the image processing unit 107 applies a color balance adjustment (step 1506) and the like, and outputs the images as shot images. The processing just described is considered as processing for reconstruction by the correlation reconstruction method.

Figure 16:
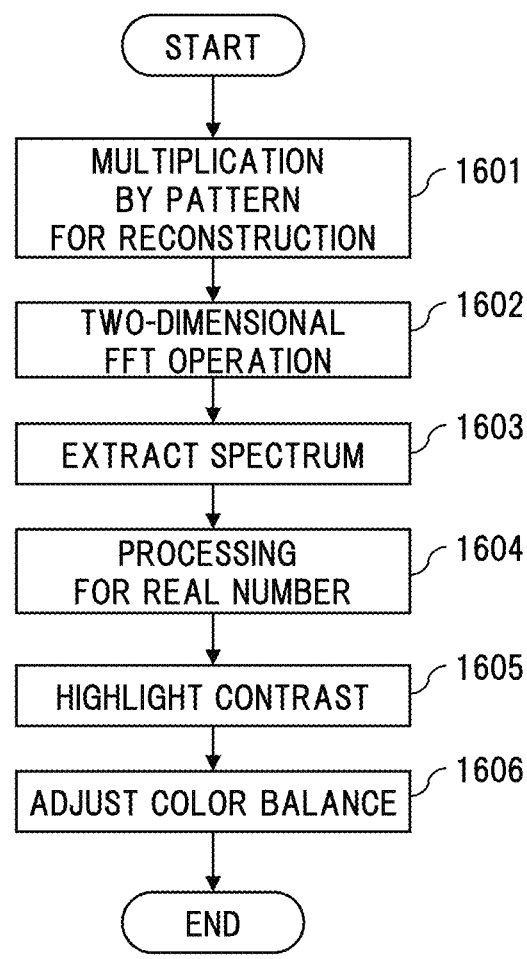
FIG. 16 is a diagram showing a processing flow example of processing for reconstruction by a moire reconstruction method.

FIG. 16 is a diagram showing a processing flow example of processing for reconstruction by the moire reconstruction method. First, the image processing unit 107 acquires the complex sensor images output from the fringe scan processing unit 106, generates the predefined pattern 801 for reconstruction for use in the processing for reconstruction, and multiplies the complex sensor images by the pattern 801 for reconstruction (step 1601).

Then, the image processing unit 107 obtains a frequency spectrum through a two-dimensional FFT operation (step 1602).

Then, the image processing unit 107 extracts data in a required frequency domain of the frequency spectrum obtained in the step 1602 (step 1603).

Descriptions of subsequent processing for real numbers in a step 1604, processing for contrast highlighting in a step 1605, and color balance adjustment in a step 1606 will be omitted, because the processing is executed in the same manner as the processing from the step 1504 to the step 1506.

Example 2

<Shooting Principle for Object at Finite Distance>

Figure 17:
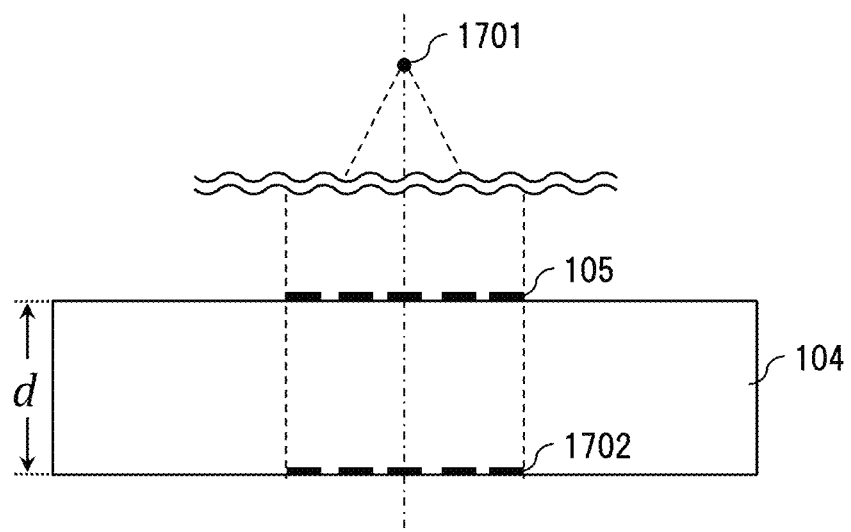
FIG. 17 is a diagram illustrating a projection example of a real pattern in the case of an object at infinity.

Next, FIG. 17 shows therein the projection of the real pattern 105 onto the image sensor 103 in the case of the thus described subject far in the distance (in the case at infinity).

FIG. 17 is a diagram illustrating a projection example of a real pattern in the case of an object at infinity. The spherical wave from a point 1701 constituting an object in the distance turns into a plane wave while propagating over a sufficiently long distance, the plane wave irradiates the real pattern 105, and in a case in which the shadow 1702 is projected to the image sensor 103, the shadow has almost the same phase as the for real pattern 105. As a result, the shadow 1702 is subjected to the processing for reconstruction with the use of the pattern for reconstruction, thereby making it possible to obtain a single bright spot. In comparison, imaging of an object at a finite distance will be described.

Figure 18:
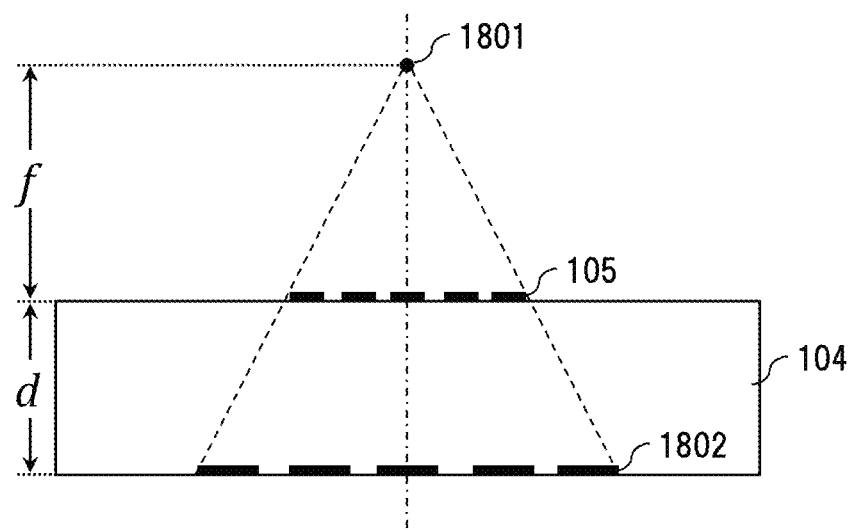
FIG. 18 is a diagram illustrating an enlarged projection example of a real pattern in the case of an object at a finite distance.

FIG. 18 is a diagram illustrating an enlarged projection example of a real pattern in the case of an object at a finite distance. In the case of an object for imaging at a finite distance, the projection of the real pattern 105 onto the image sensor 103 is enlarged more than the real pattern 105. The spherical wave from a point 1801 constituting the object irradiates the real pattern 105, and in a case in which the shadow 1802 is projected to the image sensor 103, the shadow is enlarged in an almost uniform manner. Further, the enlargement factor $\alpha$ can be calculated as follows with the use of the distance f from the real pattern 105 to the point 1801:

[Mathematical Formula 16]

$$\alpha = \frac{f+d}{f} \quad (16)$$

For this reason, for the object at the finite distance, the execution of the processing for reconstruction directly with the use of the pattern for reconstruction, designed for parallel light, fails to obtain a single bright spot.

As long as the pattern 801 for reconstruction is enlarged in accordance with the uniformly enlarged shadow of the real pattern 105, a single bright spot can be obtained again with respect to the enlarged shadow 1802. To this end, it is possible to perform a correction by adjusting the coefficient $\beta$ for the pattern 801 for reconstruction to $\beta/\alpha^2$. Thus, light from the point 1801, which is not necessarily infinity, can be selectively reproduced. Accordingly, shooting can be performed while focusing on any position. More specifically, in the case of shooting in focusing on the subject, the enlargement factor for the pattern 801 for reconstruction may be determined.

Furthermore, the present configuration also makes it possible to achieve focusing at any distance after shooting. The configuration in this case is shown in FIG. 19.

Figure 19:
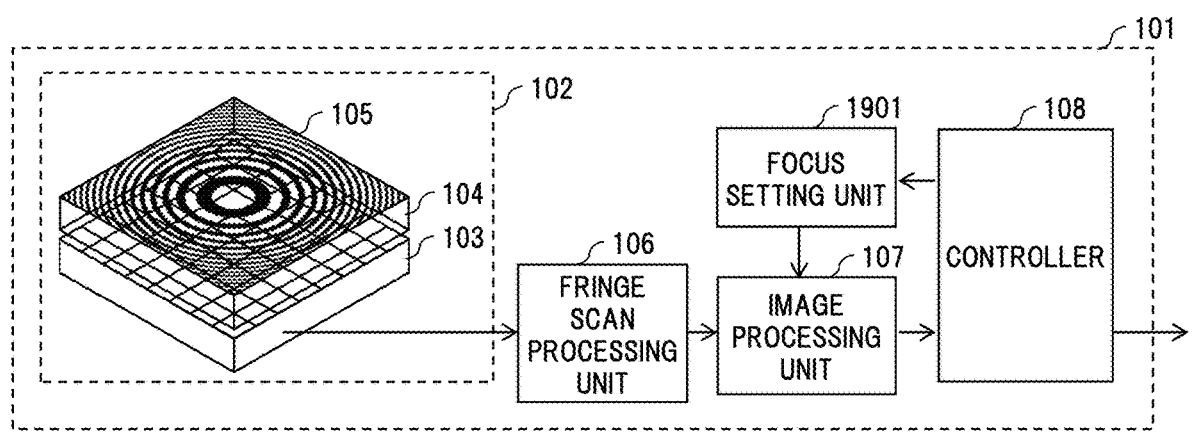
FIG. 19 is a diagram illustrating the configuration of an imaging device according to a second example of the present invention.

FIG. 19 is a diagram illustrating the configuration of an imaging device according to a second example of the present invention. The imaging device according to the second example basically has the same configuration as the imaging device according to the first example. However, the difference from the first example is the presence of a focus setting unit 1901. The focus setting unit 1901 accepts a focusing distance setting through a knob provided in the imaging device 101 or a GUI (Graphical User Interface) of a smartphone, and outputs the focusing distance information to the image processing unit 107.

Furthermore, the fact that the focus adjustment is possible after shooting as just described means that depth information is included, thereby making it possible to achieve various functions such as auto focus and ranging in the image processing unit 107.

For achieving such functions including the focus adjustment, there is a need to freely change the coefficient $\beta$ for the pattern 801 for reconstruction. However, the fringe scan operation is performed, as in the processing in the fringe scan processing unit 106 described in the present example, thereby making it possible to independently execute processing with the use of the pattern 801 for reconstruction, and thus making it possible to simplify the processing.

(Switching Between Time-Division Method and Spatial Division Method)

As described above, the time-division fringe scan and the spatial division fringe scan can be adopted as a method for the noise cancellation. The time-division fringe scan switches and then uses, depending on a passage of time, multiple real patterns 105 that differ in initial phase, thereby making it possible to use the entire surface of the image sensor, and thus allowing for responses to high resolutions and all focal points. On the other hand, this method requires shooting for each pattern, and thus requires more shooting time and memory capacity, as compared with the spatial division fringe scan. For example, shooting a moving object is difficult, because the composition is changed while switching the real pattern.

The spatial division fringe scan requires imaging only once for shooting through the use of the real pattern 1300, including multiple pattern regions that differ in initial phase, and also causes no increase in memory capacity, but divides the size of the image sensor for the allocation to the multiple pattern regions, and thus decreases the resolution obtained in each pattern region. Furthermore, it is difficult to take a closeup image. As just described, the both methods respectively have different advantages, and it is thus desirable to make it possible to switch the methods manually or automatically depending on the intended use.

For example, the imaging module 102 or the fringe scan processing unit 106 is provided with a circuit or a program for switching the both methods. Then, through event detection, such as the operation of a switch or a button provided in the imaging device 101 by a user, or the receipt of a switching request from another device via an external interface such as a USB (Universal Serial Bus) or a wireless LAN (Local Area Network), the controller 108 determines which method is used, and controls the switching via the fringe scan processing unit 106.

Alternatively, a method may be adopted in which the fringe scan processing unit 106 or the controller 108 automatically switches the spatial division fringe scan, which is normally used, to the time-division fringe scan, in a case in which an approaching subject makes a shadow on the image sensor 103 larger than a predetermined size (the area of the shadow accounts for equal to or more than an predetermined area of the image sensor). The foregoing method and configuration make it possible to achieve an imaging device which separately enables focus adjustment, auto focus, processing for ranging, and fringe scan processing.

It is to be noted that the imaging module 102 may be provided in advance with a switching mechanism for two systems of: a system including the real pattern 105 for time-division fringe scan; and a system including the real pattern 105 for spatial division fringe scan, and adapted such that the controller 108 controls the system switching to perform either fringe scan, or the liquid-crystal real pattern 105 may be used such that the controller 108 controls the system switching (how to use the real pattern 105) to perform either fringe scan. Subsequently, a problem caused in the case of using the spatial division fringe scan will be described.

Example 3

(Problem of Spatial Division Fringe Scan)

Figure 20:
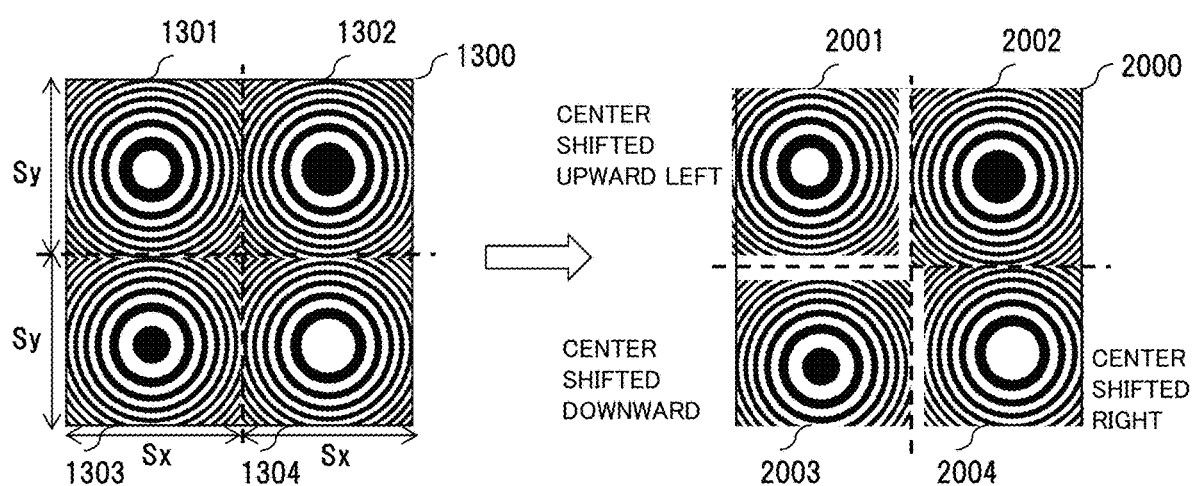
FIG. 20 is a diagram illustrating a problem example of a real pattern for spatial division fringe scan.

As mentioned above in Example 1, the spatial division fringe scan processing uses the real pattern 1300, including multiple patterns that differ in initial phase from each other as shown in FIG. 20.

FIG. 20 is a diagram illustrating a problem example of a real pattern for spatial division fringe scan. Partial real patterns 1301 to 1304, constituting the real pattern 1300, each have the same size (Sx, Sy) in the horizontal direction, and the center positions of the pattern regions (the centers of concentric circles in the case of concentric patterns) are also desirably center positions on images cut out for all of the pattern images.

However, there are cases in which the positions of the patterns are shifted from predetermined positions during the formation of the real pattern, or in the process of mounting. For example, as shown by a real pattern 2000 in FIG. 20, the center position of the upper left pattern region 1301 on the left-hand side of the figure may be shifted in an upward left direction in the figure, like a pattern region on the right-hand side of the figure, the center position of the lower left pattern region on the left-hand side of the figure may be shifted in a downward direction in the figure, like a pattern region 2003 on the right-hand side of the figure, and the center position of the lower right pattern region 1304 on the left-hand side of the figure may be shifted in a right-hand direction in the figure, like a pattern region on the right-hand side of the figure. When one image shot at the image sensor 103 is directly divided into four with the use of the real pattern 2000 with the foregoing shifts, which is followed by performing the fringe scan operation, no proper reconstructed image can be obtained due to the shifts.

(Solution 1 for Spatial Division Fringe Scan)

In order to solve the problem of the above-described shifts in the horizontal direction (the shifts on a plane surface parallel to the sensor surface of the image sensor), according to Example 3 herein, one image acquired by projecting the real pattern 1300 onto the image sensor 103 is used to detect whether any positional shift is caused or not in each of pattern regions included. In a case in which any positional shift is caused, the center positions of the respective pattern regions are searched in the processing of dividing one shadow into four in the step 1401. Then, processing is executed for cutting out an optimum size from each of the center positions. Thus, even in a case in which the real pattern 2000 is used as shown in FIG. 20, four proper shadows can be acquired. Details will be described below.

First, a shooting environment at infinity is prepared with the use of a point light source such as a LED (Light Emitting Diode) light. In this regard, the infinity refers to a position for pan-focus shot, which depends on the size of the image sensor 103 and the distance d between the real pattern and the image sensor 103. Specifically, the relation between the distance f between the point light source and the real pattern 1300 and the distance d is just as indicated in the foregoing formula 16. The distance f at which the change in enlargement factor $\alpha$ is negligibly small refers to the infinity, which indicates that the distance d has a negligibly small value. The imaging device 101 is considered to use the spatial division fringe scan.

In addition, the subsequent processing is executed by the controller 108 of the imaging device 101, for example, in the case of operating a switch or a button provided in the imaging device 101 by a user, or receiving a positioning request via an external interface such as a wireless LAN or a USB. The outline of the processing executed by the controller 108 will be described with reference to FIG. 21.

FIG. 21 is a diagram showing a processing flow example of processing for measuring a shift in horizontal position. The processing for measuring a shift in horizontal position is started in accordance with an instruction from a user, for example, in the case of requiring calibration during the manufacture or adjustment of the imaging device 101.

The controller 108 reads the positional information and size for design for each of the pattern regions constituting the real pattern 1300, from a memory (desirably a non-volatile memory in which data is held even in the case of applying no current) built in any of the imaging module 102, the fringe scan processing unit 106, the image processing unit 107, and the controller 108 (step 2201). For example, the controller 108 reads the center position A1 (x1, y1) of the pattern 1301, the center position A2 (x2, y1) of the pattern 1302, the center position A3 (x1, y2) of the pattern 1303, and the center position A4 (x2, y2) of the pattern 1304, and the size (Xc, Yc) of each pattern region.

In this regard, the information read by the controller 108 is not limited to only the center positions and sizes of the respective pattern regions, but also may be image data of the real pattern 1300, or information (in the case of a concentric circle, the color or size of the concentric circle) that can identify a shape that differs from one pattern region to another. In addition, as for the location of coordinates in FIG. 21, the upper left point in the figure is regarded as the origin(0,0), but the origin may be located in another place. In addition, the coordinates of the centers are used as mentioned above, but individual coordinates may be used for each pattern region. Furthermore, the read information is not limited to only the center positions and the size of each pattern region, but may be the position of each pattern region, or identifiable information.

Next, the controller 108 acquires a shadow 2220 on the image sensor 103 (step 2202). Specifically, the controller 108 controls the imaging module 102, the fringe scan processing unit 106, and the image processing unit 107 to acquire the shadow 2220 obtained by projecting the real pattern 1300 onto the image sensor 103.

Next, the controller 108 searches for the center position of each pattern region from the shadow 2220 (step 2203). Specifically, the controller 108 controls the image processing unit 107 to define, on the shadow 2220, a rectangular region in a predetermined size such that the center position is located in place, with the use of the center position of each pattern region, acquired in the step 2201, and determine if the rectangular region includes therein any shape near the center of each pattern region. For example, the controller 108 searches for a shape near the center as shown in FIG. 22.

Figure 22:
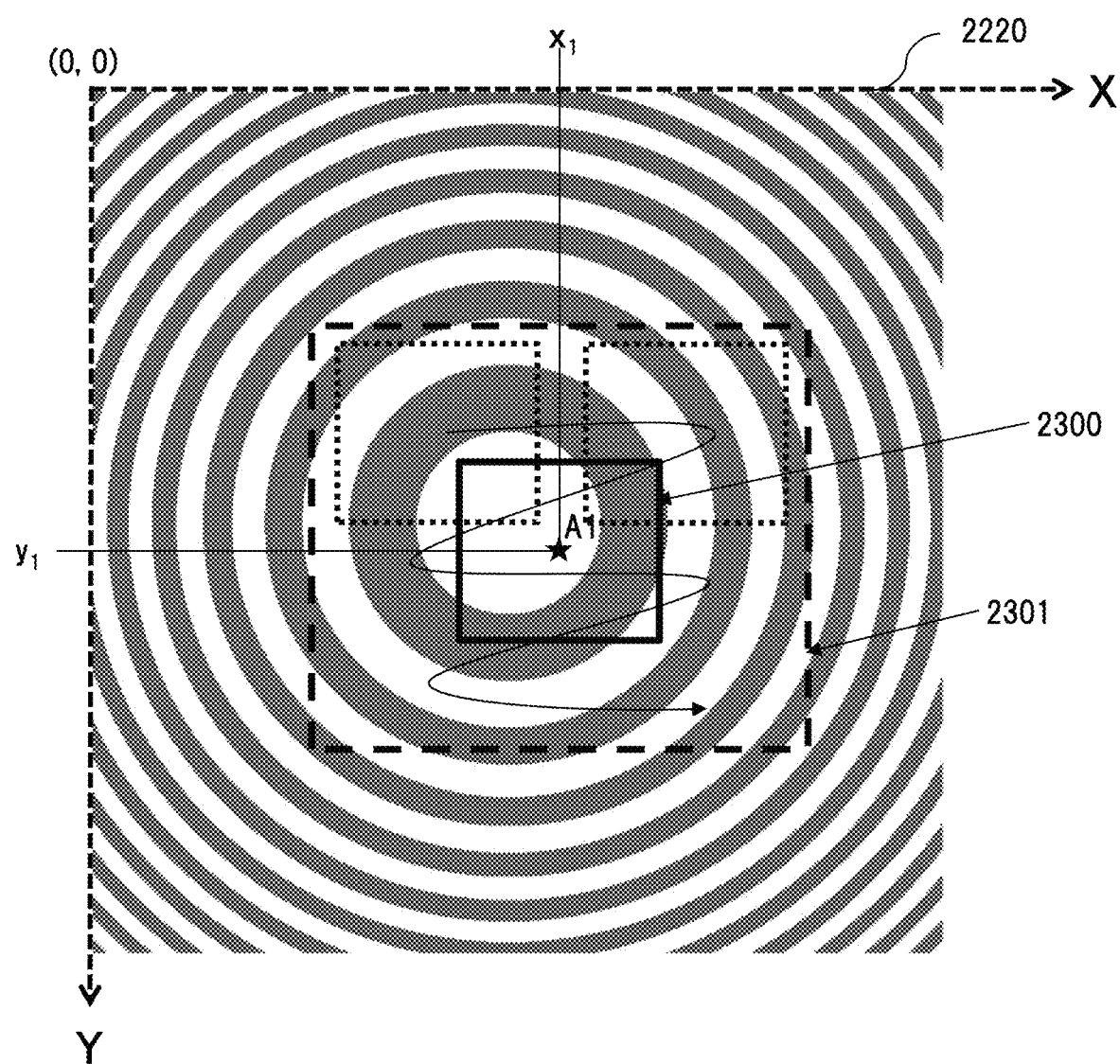
FIG. 22 is a diagram illustrating an example of search for a shift in horizontal position for each pattern region in the real pattern.

FIG. 22 is a diagram illustrating an example of search for a shift in horizontal position for each pattern region in the real pattern. The image processing unit 107 cuts out, from the shadow 2220, such a rectangular region 2300 in which the center position A1 of the pattern 1301 is centrally located, and searches for whether there is, in the rectangular region 2300, any feature point or specific shape for identifying the pattern 1301. In the case of a concentric circle like the pattern 1301, the image processing unit 107 searches for a central circle through the use of an image processing method such as circular Hough transform, for example. Then, in a case in which any feature point or specific shape is extracted, the image processing unit 107 extracts the center position A1' thereof.

On the other hand, in a case in which no desirable feature point or specific shape can be extracted from the rectangular region 2300, the image processing unit 107 performs raster scan while moving the position of the rectangular region 2300 within the range of a predetermined region 2301 around the initial rectangular region 2300. If there is no desirable feature point or specific shape in the predetermined region 2301, the image processing unit 107 determines that it is not possible to properly use the pattern with a positional shift included more than assumed, and ends the search for the center position in relation to the pattern. Then, the image processing unit 107 executes the processing in this step for the other unprocessed patterns.

Figure 23:
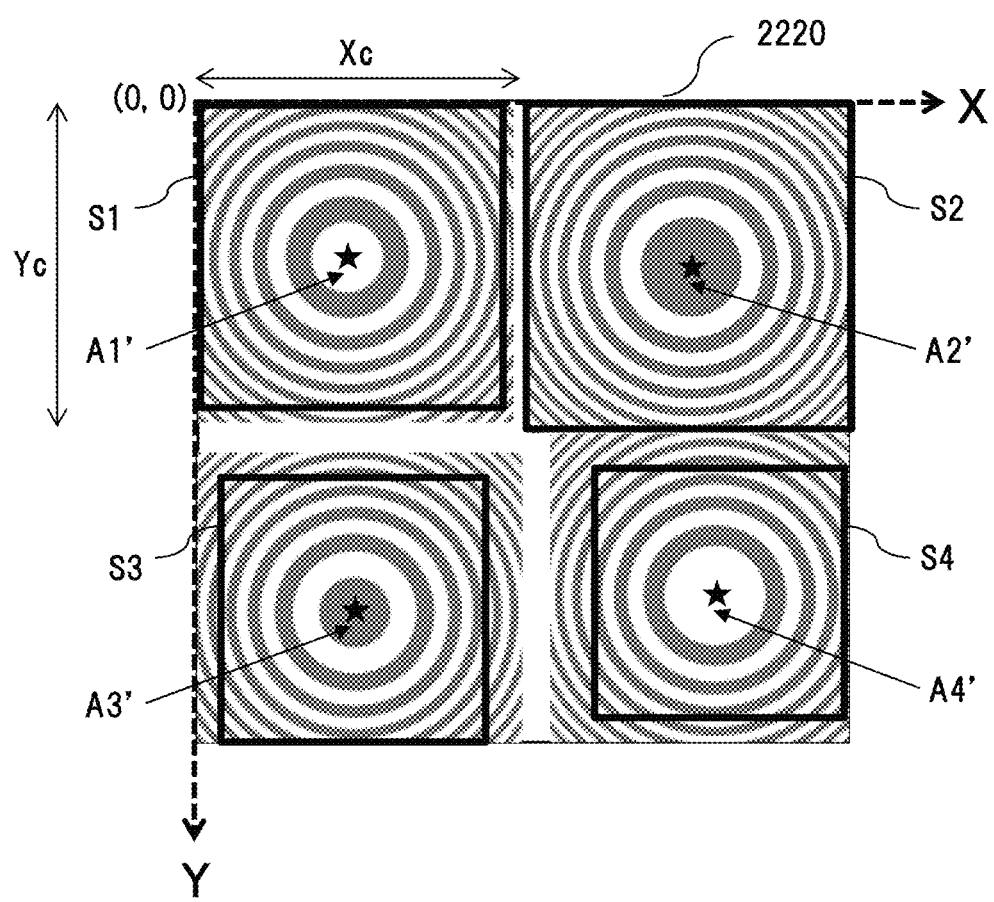
FIG. 23 is a diagram illustrating an example of cutting out a region used for each pattern region in the real pattern.

Then, the image processing unit 107 calculates the maximum size of a region that can be cut out from the center position of each pattern region (step 2204). Specifically, in a case in which the center positions A1' to A4' of the respective pattern regions can be extracted from the shadow 2220 in the step 2203, the controller 108 controls the image processing unit 107 to calculate, in the region size (Xc, Yc in FIG. 21) of each pattern region, rectangular regions in maximum sizes in which the center positions can be located in place. For example, the image processing unit 107 calculates maximum rectangular regions S1 to S4 equal to or smaller than the size of Xc, Yc respectively in which the center positions A1' to A4' of the respective pattern regions are centrally located, as shown in FIG. 23. Hereinafter, the sizes of the respective rectangular regions are referred to respectively as S1 (XS1, YS1), S2 (XS2, YS2), S3 (XS3, YS3), and S4 (XS4, YS4).

Then, the image processing unit 107 selects the minimum size from among the region sizes that can be cut out (step 2205). Specifically, the image processing unit 107 selects the rectangular region in the minimum size, from among the rectangular regions extracted in the step 2204. More specifically, the image processing unit 107 selects the minimum value XSmin from among XS1 to XS4 and the minimum value YSmin from among YS1 to YS4. Hereinafter, the minimum rectangular region is referred to as Smin (XSmin, YSmin). In this regard, in a case in which the size of Smin (XSmin, YSmin) is smaller than a predetermined size, that is, small inadequately for ensuring the specified size, the controller 108 may determine that it is not possible to properly use the pattern region with a positional shift more than predetermined, and end the processing for measuring a shift in horizontal position.

Then, the image processing unit 107 cuts out a region in the minimum size from the center position of each pattern region (step 2206). Specifically, the image processing unit 107 cuts out, from the shadow 2200, rectangular regions in the size Smin respectively in which the center positions A1' to A4' of the respective pattern regions can be located in place. Then, the image processing unit 107 executes processing that is subsequent to the fringe scan operation with the use of the spatial division fringe scan.

Then, the controller 108 holds the center positions of the respective pattern regions, and the minimum size (step 2207). Specifically, the controller 108 stores, in an internal memory, the center positions A1' to A4' of the respective pattern regions, searched in the step 2203, and the size Smin (XSmin, YSmin) selected in the step 2205.

FIG. 28 is a diagram showing a structure example of information on a shift in horizontal position. Information 2800 is structured to include an information table 2810 that stores reference positions and sizes for design (e.g., the region size and reference center position for each pattern region) for design, and an information table 2820 that stores the actual reference center position for each pattern region and the size (Smin) of the rectangular region cut out. The information table 2820 includes not only information in pan-focus shot (in the case of shooting from infinity), but also information depending on a distance or a distance range in the case of shooting from any distance within finite distance. It is to be noted that the information tables and the components are not limited to the foregoing, but may be any information or transformation equation as long as the information or transformation equation can identify the shifted position and size of each pattern region. In addition, the information tables 2810, 2820 may be stored in the same memory, or stored respectively in an internal memory of the imaging module 102 and an internal memory of the fringe scan processing unit 106.

What has been described above is the processing for measuring a shift in horizontal position. According to the processing for measuring a shift in horizontal position, the imaging device 101 can acquire regions in appropriate position from the shadow 2220 even in a case in which any positional shift is caused in any region of the real pattern as shown in FIG. 20 during the formation of the real pattern or in the process of mounting, thus providing a reconstructed image with noise reduced.

It is to be noted that the attached memories mentioned above may be memories outside the imaging device 101, rather than in the imaging device 101. In addition, the controller 108 may be configured to skip the step 2201, and the image processing unit 107 may be configured to perform raster scan for all within the region (Xc, Yc) for each pattern region in the step 2203.

In addition, in the step 2203, the common image processing method is used to search for the specific feature point or the specific shape, but other methods may be used. For example, the image processing unit 107 may be configured to create phase images from the Fourier transform of each of the real pattern 1300 and the shadow 2200 through the use of a phase only correlation method for use as a method of pattern matching, calculate a correlation function from the phase images, and detect a relative positional shift from the coordinates of the correlation peak.

In addition, the image processing unit 107 may be configured to set the rectangular region 2300 in FIG. 22 to a size including the central circle, calculate a histogram within the rectangular region subjected to raster scan, and determine that the center position is included in a case in which the same color of the central circle accounts for 80% or higher thereof.

In addition, the minimum rectangular region Smin (Xsmin, Ysmin) selected in the step 2205 meets Xsmin≤Xc and Ysmin≤Yc, and the size of the finally obtained reconstructed image may be thus excessively small in some cases. Therefore, the image processing unit 107 may be configured to fill the missing region with a predetermined value (for example, 0) such that the size reaches Xc and Yc.

In addition, the respective pieces of information, stored in the step 2207, are not limited to the center positions A1' to A4' of the respective pattern regions and the size Smin (XSmin, YSmin), but may be, for example, positional information on the four corners of the rectangular region in the size Smin in each pattern region.

After acquiring the information on the positional shift of the real pattern in accordance with the processing for measuring a shift in horizontal position, it is possible to cut out appropriate regions easily from the respective pattern regions with the use of the positional shift information held, as shown in FIG. 23.

Figure 24:
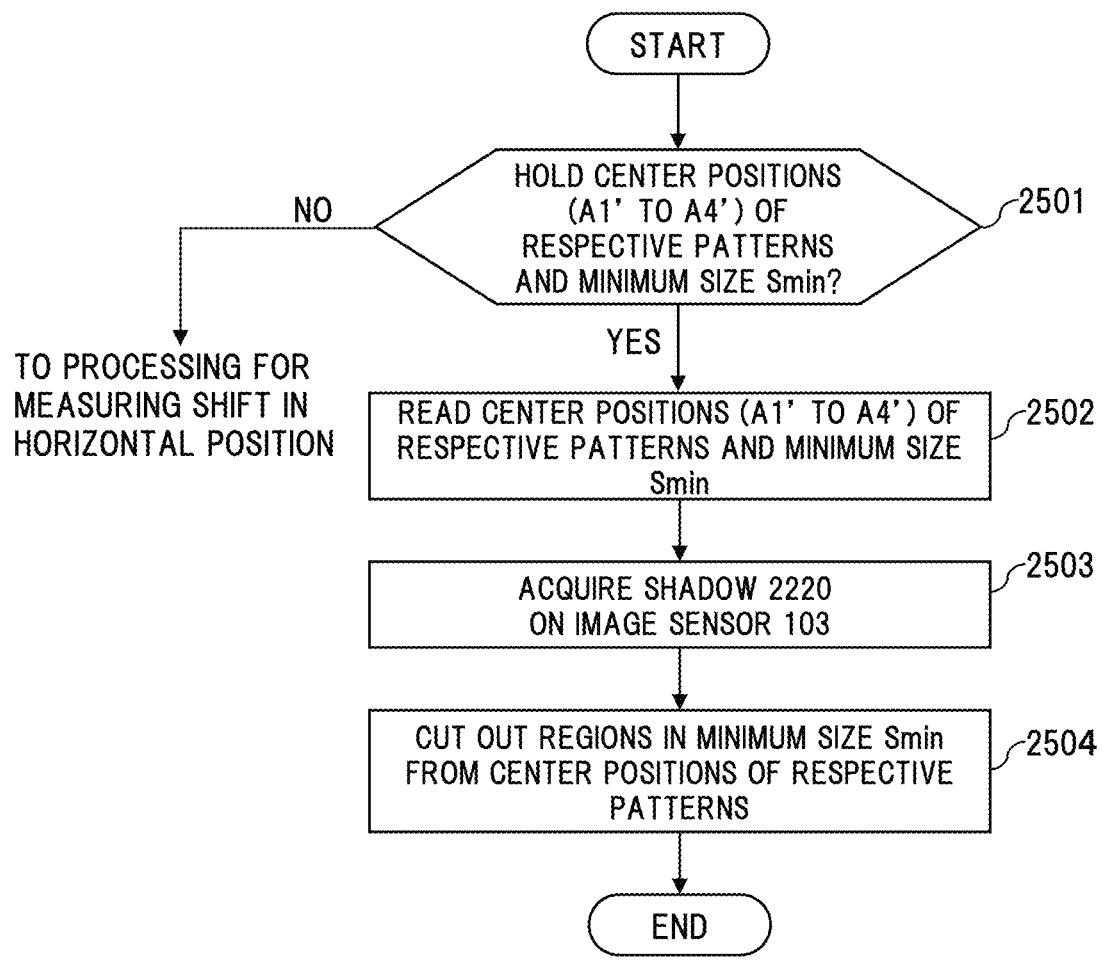
FIG. 24 is a diagram showing a processing flow example of processing for cutting out a real pattern in horizontal position.

FIG. 24 is a diagram illustrating a showing a processing flow example of processing for cutting out the real pattern in horizontal position. The processing for cutting out in horizontal position is started in the step 1401 of the fringe scan processing.

The controller 108 determines if information is held on the center positions of the respective pattern regions and the minimum size (step 2501). If the information is not held (in the case of "No" in the step 2501), the controller 108 starts the processing for measuring a shift in horizontal position. Specifically, the controller 108 determines if positional shift information regarding the center positions A1' to A4' of the respective pattern regions of the real pattern 1300 and the size Smin (XSmin, YSmin) is held in a memory built in any of the imaging module 102, the image processing unit 107, and the controller 108.

If information is held on the center positions of the respective pattern regions and the minimum size (in the case of "Yes" in the step 2501), the controller 108 reads the center positions of the respective pattern regions and the minimum size (step 2502).

Then, the controller 108 acquires a shadow on the image sensor (step 2503). Specifically, the controller 108 controls the imaging module 102 and the image processing unit 107 to acquire the image obtained by projecting the pattern 1300 onto the image sensor 103.

Then, the image processing unit 107 cuts out and acquires regions in the minimum size from the center positions of the respective pattern regions (step 2504). Specifically, the image processing unit 107 refers to the positional shift information read in the step 2502, and cuts out the regions in the minimum size from the shadow acquired in the step 2503.

What has been described above is the flow of the processing for cutting out in horizontal position. The processing for cutting out in horizontal position makes it possible to cut out, from the shadow, appropriate regions corresponding to the respective pattern regions appropriately without any shift.

Example 4

(Another Problem of Spatial Division Fringe Scan)

Figure 25:
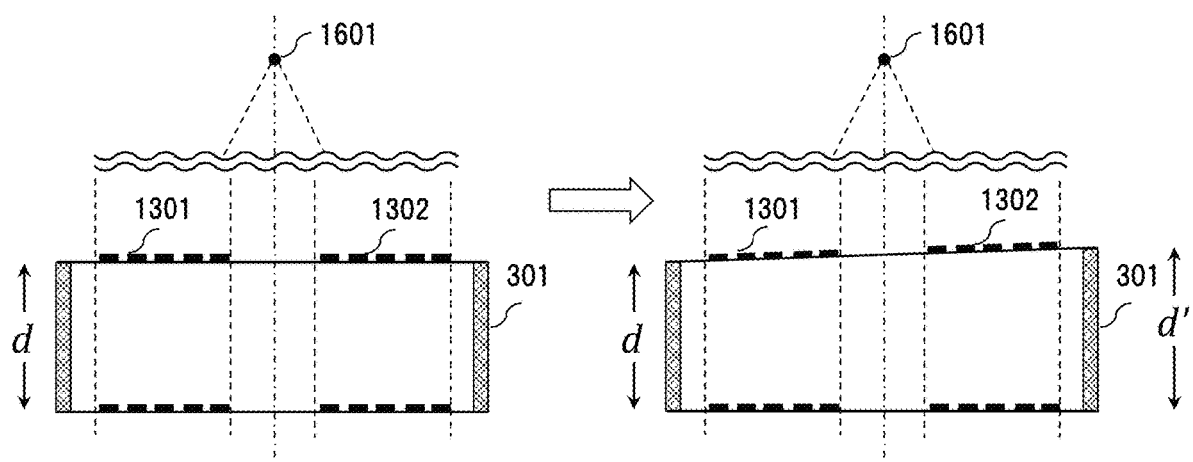
FIG. 25 is a diagram illustrating another problem example of spatial division fringe scan.

As described above, during the formation of the real pattern or in the process of mounting, or during the actual use of the present imaging device, there is a possibility that the real pattern 1300 will not be parallel to the surface of the image sensor 103 (that is, the real pattern 1300 will be inclined) as shown in FIG. 25, due to an impact or a change in environment. In such a case, an image of light received by the image sensor 103 has a different shape from the real pattern 1300 (e.g., in a case in which the real pattern 1300 is a concentric pattern, for example, an ellipsoidally distorted image is provided), thereby resulting in failure to obtain any properly reconstructed image.

(Solution 2 for Spatial Division Fringe Scan)

In order to solve the problem mentioned above, according to Example 4 herein, whether each pattern has a positional shift caused or not is detected with the use of one image acquired by projecting the real pattern 1300 onto the image sensor 103. In a case in which any positional shift is caused, a search is run for the center position for each pattern in dividing the shadow into four. Then, processing is executed for cutout in an optimum size from each center position. Thus, even in a case in which the real pattern 1300 is not parallel to the surface of the image sensor 103 as shown in FIG. 25, four appropriate shadows can be acquired. Details will be described below.

As in Example 3, a shooting environment at infinity as shown in FIG. 17 is prepared with the use of a point light source such as a LED light. The imaging device 101 is considered to use the spatial division fringe scan. It is to be noted that for ease of explanation, a case will be described in which the real pattern 1300 is inclined (rotated) only in the Y-axis direction with respect to the surface of the image sensor 103. In addition, the subsequent processing is executed by the controller 108 of the imaging device 101, for example, in the case of operating a switch or a button provided in the imaging device 101 by a user, or receiving a positioning request via an external interface such as a USB or a wireless LAN.

Figure 26:
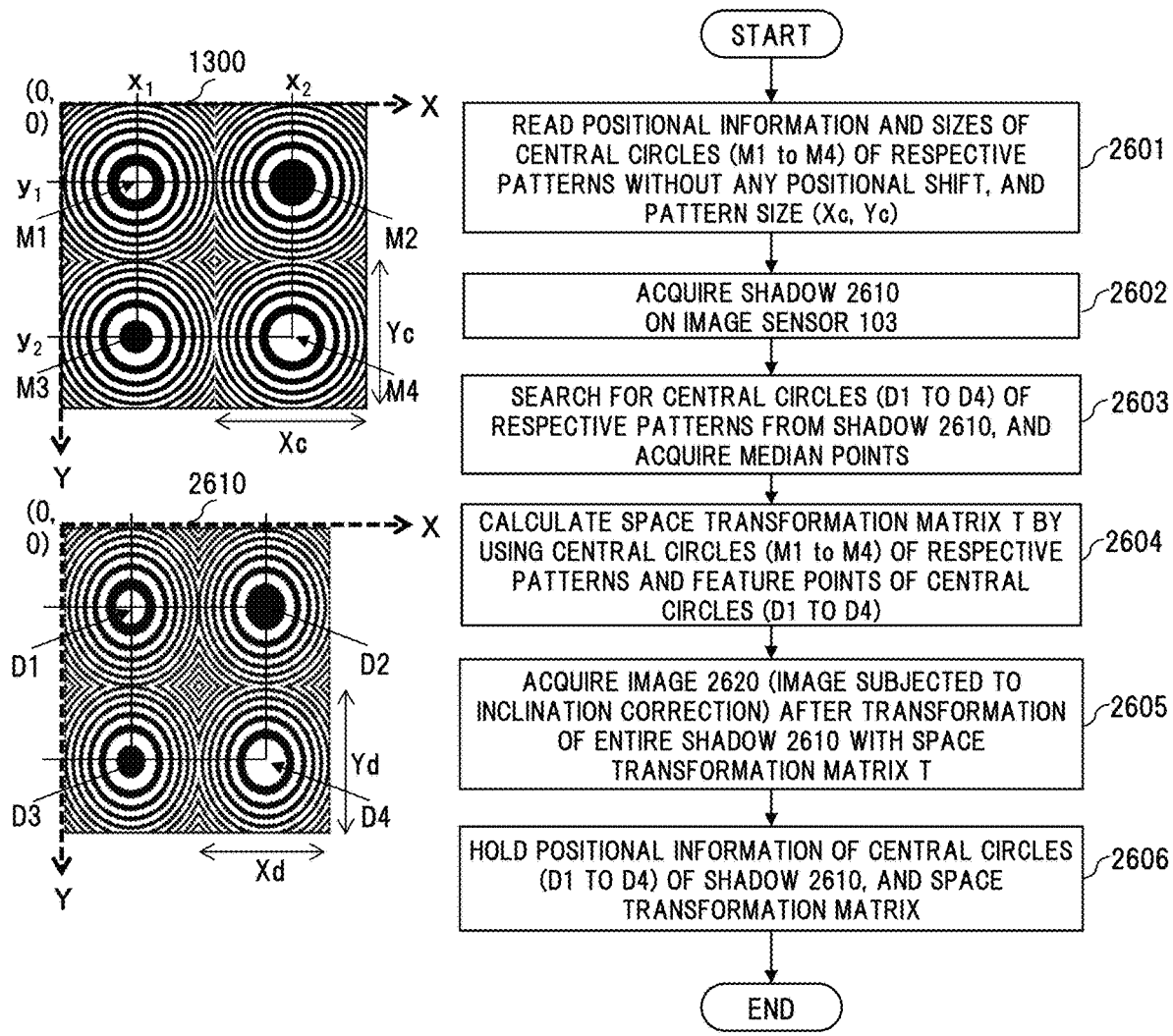
FIG. 26 is a diagram showing a processing flow example of processing for measuring an inclination.

FIG. 26 is a diagram showing a processing flow example of processing for measuring an inclination. The processing for measuring an inclination is started during the start-up process of the imaging device 101, at the timing specified by a user, or at the timing of calibration.

First, the controller 108 reads, in the absence of any positional shift, the positional information and size of a central circle of each pattern region, and the pattern size (step 2601). Specifically, the controller 108 reads various types of information including positional information on the respective pattern regions constituting the real pattern 1300, from a memory built in any of the imaging module 102, the fringe scan processing unit 106, the image processing unit 107, and the controller 108. For example, the controller 108 reads the position A1 (x1, y1), size (diameter or radius), and coloration (white) of a central circle M1 of the pattern 1301, the position A2 (x2, y1), size, and coloration (black) of a central circle M2 of the pattern 1302, the position A3 (x1, y2), size, and coloration (black) of a central circle M3 of the pattern 1303, and the position A4 (x2, y2), size, and coloration (white) of a central circle M4 of the pattern 1304, and the size (Xc, Yc) of each pattern region.

Next, the controller 108 acquires a shadow on the image sensor (step 2602). Specifically, the controller 108 controls the imaging module 102, the fringe scan processing unit 106, and the image processing unit 107 to acquire the image obtained by projecting the real pattern 1300 onto the image sensor 103. In this case, the shadow 2610 is an image obtained by rotating the real pattern 1300 around the Y axis, which is an ellipsoidal concentric circle in a case in which the pattern is a concentric circle, and the width (X axis) of the image projected is smaller than the width of the real pattern 1300.

Then, the controller 108 searches for the central circles of the respective pattern regions from the shadow, and acquires the median points (step 2603). Specifically, the controller 108 controls the image processing unit 107 to specify, on the shadow 2610, a rectangular region in an arbitrary size such that the center position is located in place, with the use of the information regarding the central circle of each pattern region, acquired in the step 2601, and determine if a shape that is similar to the central circle of each pattern region is included in the rectangular region.

Figure 27:
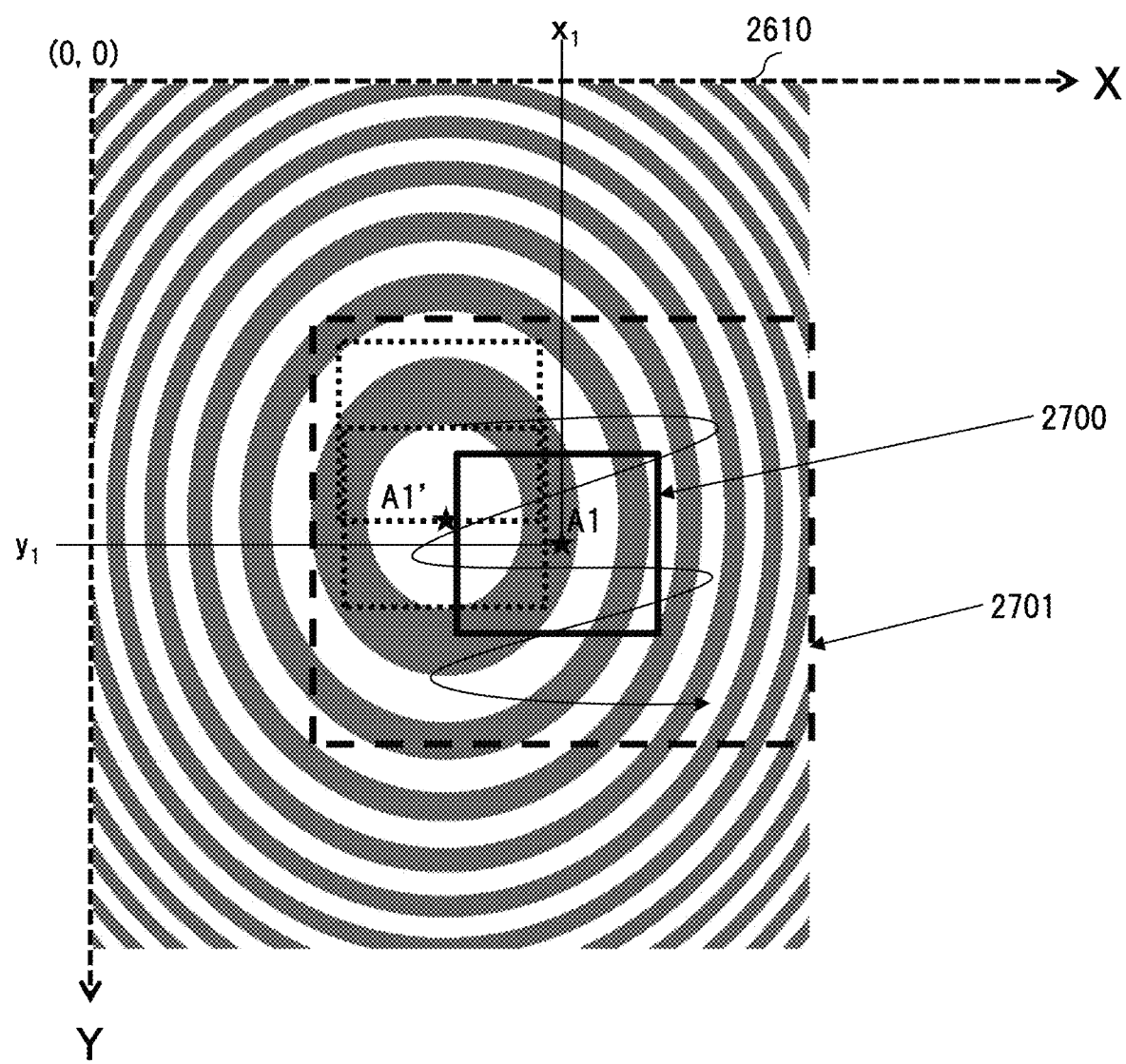
FIG. 27 is a diagram illustrating an example of search for the inclination of each pattern region in a real pattern.

FIG. 27 is a diagram illustrating an example of search for the inclination of each pattern region in the real pattern. The image processing unit 107 cuts out, from the shadow 2610, a rectangular region 2700 in which the center position A1 of the pattern 1301 is centrally located such that the entire central circle is included therein, and searches for whether there is, in the rectangular region 2700, any feature point or specific shape (an ellipsoidal shape in the case of the present example) for identifying the central circle of the pattern 1301. For the search, for example, the image processing unit 107 searches for a circular or ellipsoidal shape through the use of an image processing method such as circular Hough transform or pattern matching. Then, the image processing unit 107 extracts, in a case in which circular or ellipsoidal objects are extracted, the center positions and sizes (radiuses or diameters) of the objects (D1 to D4). In the case of an ellipse, the length of a long axis, the length of a short axis, and the rotation angle of the long axis with respect to the Y axis on the XY plane are calculated in addition to the center position.

On the other hand, in a case in which no desirable feature point or specific shape can be extracted, the image processing unit 107 performs raster scan while moving the position of the rectangular region 2700 within the range of a predetermined region (for example, a region 2701 around the initial rectangular region 2700). If there is no feature point or specific shape in the predetermined region, the controller 108 determines that it is not possible to properly use the pattern with a positional shift more than predetermined, and searches for central circles for the other patterns excluding the pattern.

Then, the image processing unit 107 calculates a space transformation matrix T with the use of the central circles for design for the respective pattern regions and the feature points of the actual central circles (step 2604). Specifically, in a case in which the objects (D1 to D4) corresponding to the central circles of the respective pattern regions can be extracted from the shadow 2610 in the step 2603, the controller 108 controls the image processing unit 107 to calculate the space transformation matrix T (or transformation equation T) with the use of the positional coordinates of multiple feature points that correlates the central circles (M1 to M4) of the respective pattern regions, acquired in the step 2601, to the objects (D1 to D4). The space transformation matrix T can be calculated from the geometric relation between a space and an image in common image processing, and for example, in accordance with an affine transformation or a projective transformation, the transformation matrix T can be calculated by a mathematical operation as long as there are three or more feature points capable of correlating. It is to be noted that as for the space transformation matrix T, multiple matrixes (for example, T1 to T4) may be calculated for each pattern, or one matrix may be calculated for the whole pattern.

Then, the image processing unit 107 acquires an image (an image subjected to an inclination correction) obtained after the transformation of the entire shadow with the space transformation matrix T (step 2605). Specifically, the controller 108 controls the image processing unit 107 to transform the shadow 2610 acquired in the step 2602 to an image 2620 without any inclination (that is, an image turned from ellipsoidal to circular without any rotation in the Y-axis direction), with the use of the space transformation matrix T acquired in the step 2604. Then, with the use of the image 2620 without any inclination instead of the shadow 2220 in the step 2202 of the processing for measuring a shift in horizontal position, the same processing as the processing in the step 2203 and the subsequent steps is performed to cut out four appropriate rectangular regions, and perform a fringe scan operation with the use of the previously described spatial division fringe scan.

Then, the controller 108 holds the positional information on the central circles of the shadow, and the space transformation matrix T (step 2606). Specifically, the controller 108 holds, in an internal memory, the space transformation matrix T calculated in the step 2604 and the positional information on the objects (D1 to D4) corresponding to the central circles.

Figure 29:
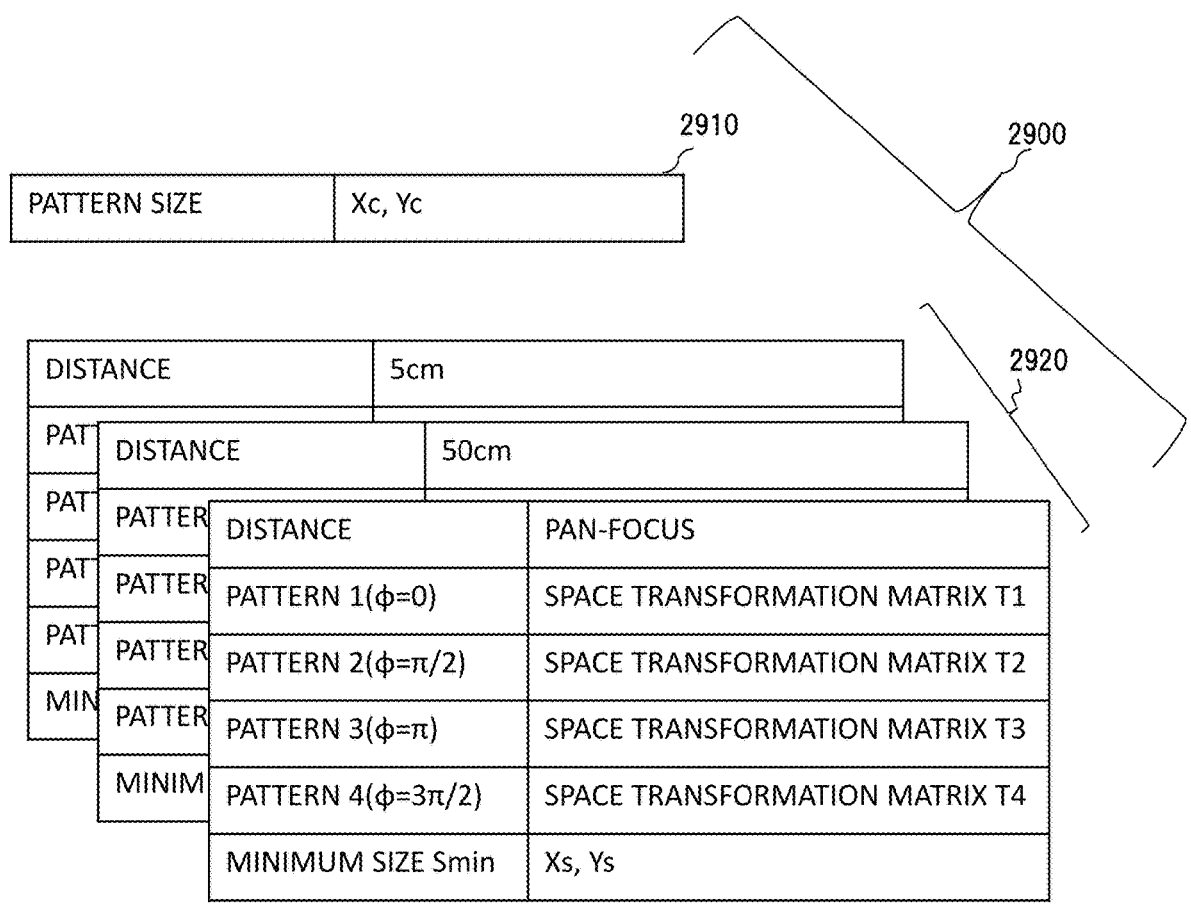
FIG. 29 is a diagram showing a structure example of information on an inclination.

FIG. 29 is a diagram showing a structure example of information on an inclination. Information 2900 is structured to include an information table 2910 that stores a reference position and a size for design (e.g., the region size for each pattern region), and an information table 2920 that stores the space transformation matrix T for calculating the original position from the acquired actual position for each pattern region, and the size (Smin) of the rectangular region cut out. The information table 2920 includes not only information in pan-focus shot (in the case of shooting from infinity), but also information depending on a distance or a distance range in the case of shooting from any distance within finite distance. It is to be noted that the information tables and the components are not limited to the foregoing, but may be any information or transformation equation as long as the information or transformation equation can identify the shifted position and size of each pattern region. In addition, the information tables 2910, 2920 may be stored in the same memory, or stored respectively in an internal memory of the imaging module 102 and an internal memory of the fringe scan processing unit 106. The storage in the internal memory as just described makes it possible to acquire regions with any inclination influence cancelled from the shadow 2220, even in a case in which the real pattern is partially or entirely inclined, thus providing a reconstructed image with noise reduced.

What has been described above is the processing for measuring an inclination. According to the processing for measuring an inclination, the imaging device 101 makes it possible to, even in a case in which the real pattern has any inclination caused as shown in FIG. 25 during the formation of the real pattern, in the process of mounting, or in measurement operation, cut out an appropriate region easily from each pattern region through the use of held information on the inclination.

The foregoing processing makes it possible to cut out an appropriate region corresponding to each pattern region appropriately from the shadow, even in a case in which the real pattern is not parallel to (inclined with respect to) the surface of the image sensor.

Example 5

Examples 2 to 4 above mention the processing for correcting a positional shift (on a plane surface parallel to the surface of the image sensor 103 with an imaging element disposed thereon) or an inclination (an inclination from a plane surface parallel to the surface of the image sensor 103 with an imaging element disposed thereon) on the XY plane in performing the spatial division fringe scan in pan-focus shot from infinity.

In Example 5, processing for correcting a positional shift of a taken image will be described for incident light that is not parallel light in shooting from a finite distance as shown in FIG. 18. In shooting with a point light source from a finite distance, the projection of the real pattern 1300 onto the image sensor 103 is enlarged almost uniformly as described above, and the enlargement factor can be calculated by the above formula 16.

Since the projection of the real pattern 1300 onto the image sensor 103 is enlarged, there is naturally a need to enlarge as well the positional shift information mentioned in Examples 3 and 4. Therefore, the positional shift enlarged appropriately is calculated and held in advance for every arbitrary distance to the point light source, and in shooting, the same correction as mentioned above is made with the use of the appropriately enlarged positional shift in accordance with the distance to the point light source which is a subject. Thus, it becomes possible to correct a positional shift or an inclination appropriately even in shooting from a finite distance.

It is to be noted that the present invention is not to be considered limited to the examples mentioned above, but considered to encompass various modification examples. For example, the examples mentioned above have been described in detail for clearly explaining the present invention, but are not necessarily to be considered limited to the inclusion of all of the configurations described.

In addition, it is possible to replace a part of a configuration according to an example with a configuration according to another example, and it is also possible to add a configuration according to an example to a configuration according to another example.

In addition, it is possible to add/remove/substitute another configuration to/from/for a part of the configuration according to each example.

In addition, the respective configurations, functions, processing units, processing means, etc. mentioned above may be partially or entirely achieved with hardware, for example, by designing with integrated circuits. In addition, the respective configurations, functions, etc. mentioned above may be achieved by software control in such a way that a processor executes operations in accordance with programs for achieving the respective functions. Information such as programs, tables, and files for achieving the respective functions can be stored on recording devices such as memories, hard disks, SSD (Solid State Drive), or recording media such as IC cards, SD cards, and DVDs (Digital Versatile Disc), read for execution by RAM (Random Access Memory) or the like, and executed by a CPU (Central Processing Unit) or the like.

In addition, the control lines and information lines are shown which are considered required for the sake of explanation, but all of the control lines and information lines required for a product are not always shown. In fact, it is conceivable that almost all of the configurations are interconnected.

In addition, the respective configurations, functions, processing units, etc. mentioned above may be partially or entirely achieved with a distribution system, for example, by execution in another device and integrated processing via a network.

In addition, the technical elements according to the embodiment mentioned above may be applied alone, or divided into multiple parts such as a program component and a hardware component, and then applied.

What is claimed is:

1. An imaging device comprising:
a modulator including a real pattern and configured to modulate an intensity of light, based on the real pattern;
an image sensor configured to convert light passing through the modulator to electrical signals to generate a sensor image;
a complex sensor image processing unit configured to generate a complex sensor image comprising a complex number, from an image obtained by executing predetermined positioning for the sensor image taken through the real pattern; and
an image processing unit configured to restore an image, based on an operation with the complex sensor image and data of a pattern for reconstruction,
wherein the complex sensor image processing unit detects a shadow of a pattern region in the real pattern,
the complex sensor image processing unit identifies information on a shift of the shadow of the pattern region on a plane surface parallel to a sensor surface of the image sensor and stores the information in a storage, and
the complex sensor image processing unit uses the information on the shift to execute predetermined positioning for the sensor image.

2. The imaging device according to claim 1,
the complex sensor image processing unit uses the information on the shift to correct the sensor image, and
the complex sensor image processing unit cuts out images within a mutually common range, from the shadows obtained for each of the pattern regions, and generates a complex sensor image comprising a complex number.

3. The imaging device according to claim 1,
wherein the real pattern is a first real pattern, the first real pattern comprising multiple pattern regions that differ in phase, or a second real pattern, the second real pattern switched to a single pattern region that differs in phase, depending on a passage of time, and
wherein the imaging device comprises a control unit configured to switch between the first real pattern and the second real pattern.

4. An imaging device comprising:
a modulator including a real pattern and configured to modulate an intensity of light, based on the real pattern;
an image sensor configured to convert light passing through the modulator to electrical signals to generate a sensor image;
a complex sensor image processing unit configured to generate a complex sensor image comprising a complex number, from an image obtained by executing predetermined positioning for the sensor image taken through the real pattern; and
an image processing unit configured to restore an image, based on an operation with the complex sensor image and data of a pattern for reconstruction,
wherein the complex sensor image processing unit detects a shadow of a pattern region in the real pattern,
the complex sensor image processing unit calculates, based on a distance to a subject, a shift of the shadow of the pattern region and stores the shift in a storage unit, and
the complex sensor image processing unit uses information on the shift to execute positioning for the sensor image, depending on the distance to the subject.

5. An imaging device comprising:
a modulator including a real pattern and configured to modulate an intensity of light, based on a real pattern, the pattern comprising multiple pattern regions that differ in phase;
an image sensor configured to convert light passing through the modulator to electrical signals to generate a sensor image;
a storage unit configured to store positioning information for executing positioning for a shadow of the pattern region, the shadow projected through the modulator onto the image sensor; and
a complex sensor image processing unit configured to generate a complex sensor image comprising a complex number, from an image obtained by executing predetermined positioning for the sensor image taken through the real pattern,
wherein the complex sensor image processing unit detects a shadow of a pattern region in the real pattern,
the complex sensor image processing unit identifies information on a shift of the shadow of the pattern region on a plane surface parallel to a sensor surface of the image sensor and stores the information in a storage, and
the complex sensor image processing unit uses the information on the shift to execute predetermined positioning for the sensor image.

6. An imaging method comprising:
a modulating step of modulating an intensity of light, based on a real pattern;
an image generating step of converting the light modulated in the modulating step to electrical signals to generate a sensor image;
a complex sensor image generating step of generating a complex sensor image comprising a complex number, from an image obtained by executing predetermined positioning for the sensor image taken through the real pattern; and
an image processing step of restoring an image, based on an operation with the complex sensor image and data of a pattern for reconstruction,
wherein the complex sensor image generating step comprises the steps of:
detecting a shadow of a pattern region in the real pattern,
identifying information on a shift of the shadow of the pattern region on a plane surface parallel to a sensor surface of the image sensor and stores the information in a storage, and
executing predetermined positioning for the sensor image using the information on the shift.

* * * * *